United States Patent
Yang

(10) Patent No.: US 12,106,525 B2
(45) Date of Patent: Oct. 1, 2024

(54) METHODS AND DECOMPRESSION UNITS FOR DECOMPRESSING IMAGE DATA COMPRESSED USING PATTERN-BASED COMPRESSION

(71) Applicant: Imagination Technologies Limited, Kings Langley (GB)

(72) Inventor: Xile Yang, Rickmansworth (GB)

(73) Assignee: Imagination Technologies Limited, Kings Langley (GB)

(*) Notice: Subject to any disclaimer, the term of this patent is extended or adjusted under 35 U.S.C. 154(b) by 720 days.

(21) Appl. No.: 17/217,363

(22) Filed: Mar. 30, 2021

(65) Prior Publication Data
US 2021/0352292 A1 Nov. 11, 2021

(30) Foreign Application Priority Data

Mar. 30, 2020 (GB) ...................................... 2004637
Mar. 30, 2020 (GB) ...................................... 2004639

(51) Int. Cl.
| | |
|---|---|
| *G06T 9/00* | (2006.01) |
| *G06T 3/40* | (2006.01) |
| *G06T 7/10* | (2017.01) |
| *H04N 19/119* | (2014.01) |
| *H04N 19/136* | (2014.01) |

(Continued)

(52) U.S. Cl.
CPC ................. *G06T 9/00* (2013.01); *G06T 3/40* (2013.01); *G06T 7/10* (2017.01); *H04N 19/119* (2014.11); *H04N 19/136* (2014.11); *H04N 19/176* (2014.11); *H04N 19/186* (2014.11); *G06T 2207/20021* (2013.01)

(58) Field of Classification Search
CPC .... G06T 9/00; G06T 3/40; G06T 7/10; G06T 2207/20021; G06T 9/008; H04N 19/119; H04N 19/136; H04N 19/176; H04N 19/186; H04N 19/423; H04N 19/94; H04N 19/42; H04N 19/122
USPC ........................................................ 382/166
See application file for complete search history.

(56) References Cited

U.S. PATENT DOCUMENTS

| | | | | |
|---|---|---|---|---|
| 2011/0188750 | A1* | 8/2011 | Tamura ................... | G09G 5/02 382/167 |
| 2011/0299767 | A1* | 12/2011 | Ichikawa ............... | H04N 19/46 382/162 |

(Continued)

FOREIGN PATENT DOCUMENTS

| | | |
|---|---|---|
| CN | 108293125 A | 7/2018 |
| GB | 2451911 A | 2/2009 |

(Continued)

*Primary Examiner* — Neil R Mclean
(74) *Attorney, Agent, or Firm* — Potomac Law Group, PLLC; Vincent M DeLuca

(57) ABSTRACT

Methods and decompression units for decompressing a selected sub-block of image element values from a compressed block of image element values. The method includes: identifying, from the compressed block of image element values, a pattern of a plurality of patterns of image element values associated with the selected sub-block; identifying, from the compressed block of image element values, one or more image element values associated with the selected sub-block; and generating the selected sub-block from the pattern and the one or more image element values associated with the selected sub-block.

20 Claims, 23 Drawing Sheets

(51) Int. Cl.
*H04N 19/176* (2014.01)
*H04N 19/186* (2014.01)

(56) References Cited

U.S. PATENT DOCUMENTS

2017/0280144 A1 9/2017 Dvir et al.
2017/0324983 A1* 11/2017 Fenney ............... H03M 7/3068

FOREIGN PATENT DOCUMENTS

| | | |
|---|---|---|
| GB | 2530312 B | 9/2016 |
| GB | 2530311 B | 1/2017 |
| GB | 2586516 A | 2/2021 |
| GB | 2586517 A | 2/2021 |
| WO | 2016074744 A1 | 5/2016 |

* cited by examiner

COLUMNS

|   | 0 | 1 | 2 | 3 | 4 | 5 | 6 | 7 |
|---|---|---|---|---|---|---|---|---|
| 0 | $V_{0,0}$ | $V_{0,1}$ | $V_{0,2}$ | $V_{0,3}$ | $V_{0,4}$ | $V_{0,5}$ | $V_{0,6}$ | $V_{0,7}$ |
| 1 | $V_{1,0}$ | $V_{1,1}$ | $V_{1,2}$ | $V_{1,3}$ | $V_{1,4}$ | $V_{1,5}$ | $V_{1,6}$ | $V_{1,7}$ |
| 2 | $V_{2,0}$ | $V_{2,1}$ | $V_{2,2}$ | $V_{2,3}$ | $V_{2,4}$ | $V_{2,5}$ | $V_{2,6}$ | $V_{2,7}$ |
| 3 | $V_{3,0}$ | $V_{3,1}$ | $V_{3,2}$ | $V_{3,3}$ | $V_{3,4}$ | $V_{3,5}$ | $V_{3,6}$ | $V_{3,7}$ |
| 4 | $V_{4,0}$ | $V_{4,1}$ | $V_{4,2}$ | $V_{4,3}$ | $V_{4,4}$ | $V_{4,5}$ | $V_{4,6}$ | $V_{4,7}$ |
| 5 | $V_{5,0}$ | $V_{5,1}$ | $V_{5,2}$ | $V_{5,3}$ | $V_{5,4}$ | $V_{5,5}$ | $V_{5,6}$ | $V_{5,7}$ |
| 6 | $V_{6,0}$ | $V_{6,1}$ | $V_{6,2}$ | $V_{6,3}$ | $V_{6,4}$ | $V_{6,5}$ | $V_{6,6}$ | $V_{6,7}$ |
| 7 | $V_{7,0}$ | $V_{7,1}$ | $V_{7,2}$ | $V_{7,3}$ | $V_{7,4}$ | $V_{7,5}$ | $V_{7,6}$ | $V_{7,7}$ |

ROWS

METHODS AND DECOMPRESSION UNITS FOR DECOMPRESSING IMAGE DATA COMPRESSED USING PATTERN-BASED COMPRESSION

BACKGROUND

Data compression, both lossless and lossy, is desirable in many applications in which data is to be stored in, and/or read from memory. By compressing data before storage of the data in memory, the amount of data transferred to the memory may be reduced. An example of data for which data compression is particularly useful is image data. The term 'image data' is used herein to refer to two-dimensional data that has a value corresponding to each pixel or each sample location of an image that is produced as part of a rasterization process on a Graphics Processing Unit (GPU). Image data includes, but is not limited to, depth data to be stored in a depth buffer, pixel data (e.g. colour data) to be stored in a frame buffer, texture data to be stored in a texture buffer and surface normal data to be stored in a surface normal buffer. These buffers may be any suitable type of memory, such as cache memory, separate memory subsystems, memory areas in a shared memory system or some combination thereof.

A GPU may be used to process data in order to generate image data. For example, a GPU may determine pixel values (e.g. colour values) of an image to be stored in a frame buffer which may be output to a display. GPUs usually have highly parallelised structures for processing large blocks of data in parallel. There is significant commercial pressure to make GPUs (especially those intended to be implemented on mobile/embedded devices) operate at lower power levels. Competing against this is the desire to use higher quality rendering algorithms on fast GPUs, which thereby puts pressure on a relatively limited resource: memory bandwidth. However, increasing the bandwidth of the memory subsystem might not be an attractive solution because moving data to and from, and even within, the GPU consumes a significant portion of the power budget of the GPU. The same issues may be relevant for central processing units (CPUs) as well as GPUs.

FIG. 1 shows an example graphics rendering system 100 which may be implemented in an electronic device, such as a mobile/embedded device. The graphics rendering system 100 comprises a host CPU 102, a GPU 104, a memory 106 (e.g. graphics memory) and a display 108. The CPU 102 is configured to communicate with the GPU 104. Data, which may be compressed data, can be transferred in either direction, between the GPU 104 and the memory 106. Images (e.g. pixel data) which are rendered by the GPU 104 may be stored in memory 106 and displayed on the display 108 via a display interface 116.

The GPU 104 comprises a rendering unit 110, a compression/decompression unit 112, and a memory interface 114. The graphics rendering system 100 is arranged such that data can pass, in either direction, between (i) the CPU 102 and the rendering unit 110; (ii) the CPU 102 and the memory interface 114; (iii) the memory interface 114 and the memory 106; (iv) the rendering unit 110 and the compression/decompression unit 112; (v) the compression/decompression unit 112 and the memory interface 114; and (vi) the memory 106 and the display interface 116. In some examples, the graphics rendering system 100 may be further arranged such that data can pass to and from the compression/decompression unit 112 to the display interface 116, and such that data can pass from the display interface 116 to the display 108.

In operation, the GPU 104 processes regions of image data individually. The regions may for example represent rectangular (including square) portions of the render space (i.e. the two-dimensional space representing, for example, an image area to be rendered). The rendering unit 110 may perform scan conversion and rasterization of graphics primitives, such as, but not limited to, triangles and lines, using known techniques such as Z-tests and texture mapping. The rendering unit 110 may contain cache units to reduce memory traffic. Some data is read or written by the rendering unit 110, to the memory 106 via the memory interface 114 (which may include a cache) but for other data, such as data to be stored in a buffer, such as the frame buffer, the data preferably goes from the rendering unit 110 to the memory interface 114 via the compression/decompression unit 112. The compression/decompression unit 112 reduces the amount of data that is to be transferred across the external memory bus to the memory 106 by compressing the data.

The display interface 116 sends data defining a completed image to the display 108. An uncompressed image may be accessed directly from the memory 106. Compressed data may be decompressed via the compression/decompression unit 112 and sent as uncompressed data to the display 108. In alternative examples the compressed data could be read directly by the display interface 116 and the display interface 116 could include logic for decompressing the compressed data in an equivalent manner to the decompression of the compression/decompression unit 112. Although shown as a single entity, the compression/decompression unit 112 may contain multiple parallel compression and/or decompression units for enhanced performance.

As is known to a person of skill in the art, the rendering unit 110 may generate a colour value (e.g. RGB colour value or RGBA colour value) for each pixel in the render space and store the colour values in the frame buffer. The collection of colour values for a frame may be referred to herein as colour data, image data, frame buffer data or simply frame data. The rendering unit 110 may also generate other image data, such as depth data, surface normal data, lighting data, etc., and may store those image data values in one or more buffers in memory 106. These buffers may, in some cases, be referred to as frame buffers, while in other cases the term "frame buffer" may be reserved for buffers which store colour values or which store data to be sent to the display.

In some graphics rendering systems the image data values stored in a buffer for a particular render may be used by the rendering unit 110 to render one or more subsequent frames. For example, colour values generated by one render may be used as texture values in the rendering of one or more subsequent frames, and surface normal values generated for a geometric model in one render may be used to apply lighting effects to the same model during the rendering of one or more subsequent frames.

Since the image data (e.g. colour data) can be quite large the memory bandwidth associated with writing image data to a buffer in memory and reading the image data from the buffer in memory may be a significant portion of the total memory bandwidth of the graphics processing system and/or the GPU. As a result, the image data is often compressed, via the compression/decompression unit 112, prior to being stored in a buffer and decompressed, via the compression/decompression unit 112, after being read from the buffer. Since image data often comprises colour data, compression methods may be designed to suit the particular characteristics of colour data. In other examples, compression methods may be designed for the different characteristics of depth data, or surface normal data.

Known lossless methods for compressing colour data, such as those described in the Applicant's UK Patents 2451911, 2530312 and 2530311 are configured to divide the colour data into blocks and compress each block individually in a manner that requires the whole block to be decompressed together. For example, in these compression methods an 8×8 pixel block of colour values may be compressed together. Then to access any particular colour value in that block the whole compressed 8×8 pixel block has to be decompressed.

However, the rendering unit 110 doesn't typically need all the data (e.g. colour values) in a block for rendering a subsequent frame. For example, the rendering unit 110 may only need colour values related to a few pixels in a block. Accordingly, having to decompress a whole block to access only a small number of colour values in that block can make accessing the colour data in the frame buffer inefficient for the rendering unit 110.

Attempts have been made to address this problem by caching the decompressed blocks, but in many cases having a cache doesn't significantly improve the efficiency of accessing the data (e.g. colour values) in the frame buffer.

The embodiments described below are provided by way of example only and are not limiting of implementations which solve any or all of the disadvantages of known image data compression and/or decompression methods.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and compression units for compressing a two-dimensional block of image element values, and methods and decompression units for decompressing image data so compressed. The compression method includes: dividing the two-dimensional block of image element values into a plurality of sub-blocks of image element values; identifying which pattern of a plurality of patterns is formed by the image element values of a first sub-block of the plurality of sub-blocks; and forming a compressed block of image element values by encoding the first sub-block in the compressed block of image element values with: (i) information identifying the pattern, and (ii) the image element values of the first sub-block forming the pattern.

A first aspect provides a method of decompressing a selected sub-block of image element values from a compressed block of image element values, the method comprising: identifying, from the compressed block of image element values, a pattern of a plurality of patterns of image element values associated with the selected sub-block; identifying, from the compressed block of image element values, one or more image element values associated with the selected sub-block; and generating the selected sub-block from the pattern and the one or more image element values associated with the selected sub-block.

The compressed block of image element values may be divided into a plurality of sub-blocks. The compressed block of image element values may comprises information, for each sub-block of the plurality of sub-blocks, identifying an encoding format for that sub-block. The pattern associated with the selected sub-block may be identified from the information identifying the encoding format of the selected sub-block.

The information identifying the encoding format of a sub-block may be a value that identifies one pattern of the plurality of patterns.

The compressed block of image element values may comprise, for each sub-block of the plurality of sub-blocks, an image element value unit that comprises one or more image element values associated with that sub-block; and the image element values associated with the selected sub-block may be the image element values in the image element value unit for the selected sub-block.

The information identifying the encoding format of a sub-block may identify (i) one pattern of the plurality of patterns or (ii) another sub-block that matches that sub-block; and identifying, from the compressed block of image element values, the pattern of the plurality of patterns associated with the selected sub-block may comprise: if the information identifying the encoding format of the selected sub-block identifies one pattern, identifying that pattern as the pattern associated with the selected sub-block; and if the information identifying the encoding format of the selected sub-block identifies another sub-block that matches the selected sub-block, identifying a pattern associated with the matching sub-block as the pattern associated with the selected sub-block.

The information identifying the encoding format of a sub-block may be a value that identifies (i) one pattern of the plurality of patterns; or (ii) another sub-block that matches that sub-block.

The information identifying the encoding format of a sub-block may identify another sub-block that matches that sub-block by identifying a match type of one or more match types. The one or more match types may comprise a plurality of match types. Each match type may identify a set of two or more sub-blocks of the plurality of sub-blocks that have one of one or more predetermined relationships and all match. Each match type may act as a pointer to one of the sub-blocks in the set of two or more sub-blocks. Each set of two or more sub-blocks that have one of the one or more predetermined relationships may be identified by a mask.

The compressed block of image element values may comprise, for each sub-block whose corresponding information identifying the encoding format of the sub-block identifies one pattern, an image element value unit that comprises one or more image element values associated with that sub-block; and the image element values associated with the selected sub-block may be the image element values in a relevant image element value unit, the relevant image element value unit being the image element value unit associated with that sub-block or the image element value unit associated with the matching sub-block.

The compressed block of image element values may comprise, for each sub-block whose corresponding information identifying the encoding format of the sub-block identifies one pattern, an image element value unit that comprises the one or more image element values of that sub-block that form the identified pattern; and the image element values associated with the selected sub-block may be the image element values in a relevant image element value unit, the relevant image element value unit being the image element value unit associated with that sub-block or the image element value unit associated with the matching sub-block.

The sub-blocks may be ordered. The image element value units may be stored in the compressed block in the order of their corresponding sub-blocks. The method may further comprise identifying a location of the relevant image element value unit in the compressed block based on the information identifying the encoding format for each of the sub-blocks preceding the selected sub-block in the order.

Identifying the location of the relevant image element value unit in the compressed block may comprise identifying a number of image element values preceding the relevant image element value unit in the compressed block of image element values.

One or more of the information identifying the encoding format of a sub-block may identify a pattern of the plurality of patterns. Each pattern may be formed by a number of image element values. Identifying a number of image element values preceding the relevant image element value unit may comprise summing the number of image element values forming the patterns identified by the information identifying the encoding format for the sub-blocks preceding the selected sub-block in the order.

The image element value units may be stored in a body of the compressed block of image values.

The information identifying the encoding format of a sub-block may comprise a fixed-length encoding format field. The length of the fixed-length encoding format field may be based on the number of patterns in the plurality of patterns and the number of match types in the one or more match types.

The information identifying the encoding format of each sub-block of the plurality of sub-blocks may be stored in a header of the compressed block of image element values.

Each pattern of the plurality of patterns may define a number of image element values and a location of those image element values in a sub-block.

Each image element value may be a colour value.

Each image element value may be a compressed value representing a colour value.

Each compressed value may comprise a sub-value for each of a plurality of colour channels.

The image element values may have been generated by a rasterization process on a graphics processing unit.

Each sub-block may comprise an N×M block of image element values wherein N and M are integers greater than or equal to one.

N and M may be equal to two.

The method may further comprise outputting the generated sub-block.

The plurality of patterns may not include all of the possible patterns of image element values in a sub-block. In other words, the plurality of patterns may comprise fewer patterns than all possible patterns of image element values in a sub-block.

A second aspect provides a decompression unit to decompress a selected sub-block of image element values from a compressed block of image element values, the decompression unit comprising: a pattern identification unit configured to identify, from the compressed block of image element values, a pattern of a plurality of patterns of image element values associated with the selected sub-block; an image element identification unit configured to identify, from the compressed block of image element values, one or more image element values associated with the selected sub-block; and a sub-block reconstruction unit configured to generate the selected sub-block from the pattern and the one or more image element values associated with the selected sub-block.

A third aspect provides a decompression unit configured to perform the method of the first aspect.

The compression units, decompression units and compression/decompression units described herein may be embodied in hardware on an integrated circuit. There may be provided a method of manufacturing, at an integrated circuit manufacturing system, a compression unit, a decompression unit or a compression/decompression unit described herein. There may be provided an integrated circuit definition dataset that, when processed in an integrated circuit manufacturing system, configures the system to manufacture the compression unit, the decompression unit or the compression/decompression unit. There may be provided a non-transitory computer readable storage medium having stored thereon a computer readable description of a compression unit, a decompression unit or a compression/decompression unit that, when processed in an integrated circuit manufacturing system, causes the integrated circuit manufacturing system to manufacture an integrated circuit embodying a compression unit, a decompression unit or a compression/decompression unit.

There may be provided an integrated circuit manufacturing system comprising: a non-transitory computer readable storage medium having stored thereon a computer readable description of a compression unit, a decompression unit or a compression/decompression unit described herein; a layout processing system configured to process the computer readable description so as to generate a circuit layout description of an integrated circuit embodying the compression unit, the decompression unit or the compression/decompression unit; and an integrated circuit generation system configured to manufacture the compression unit, decompression unit, or the compression/decompression unit according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 3 is a schematic diagram of an example block of image data;

Figure 1:
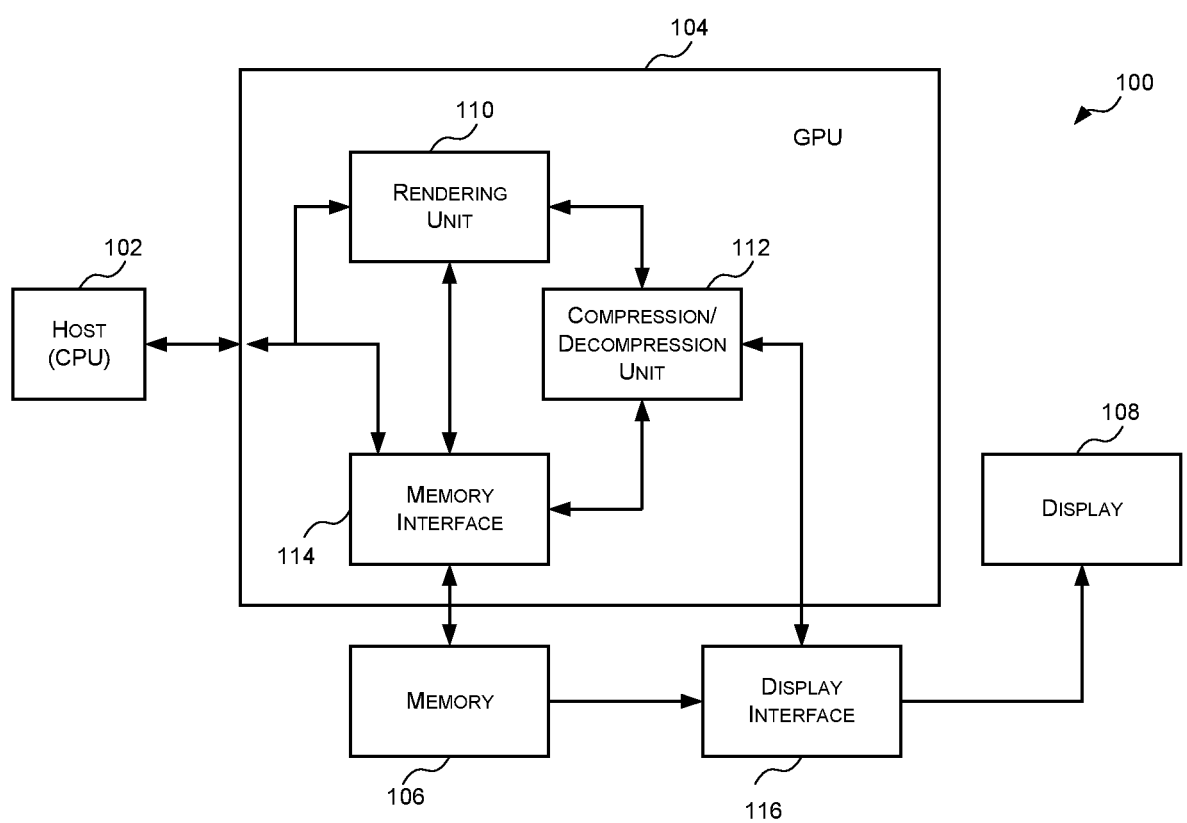
FIG. 1 is a block diagram of an example graphics rendering system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

As described above, compressing image data on a block basis in a manner that requires decompression of the whole block to access individual values makes it difficult for the logic, such as the rendering logic, that randomly accesses the image data to access the data efficiently. The Applicant's UK Patent Applications 1912183.9, 1912184.7, 1912795.0, and 1912800.8, which are herein incorporated by reference in their entirety, describe a lossless method of compressing image data which allows the compressed data to be randomly accessed (i.e. individual values in the compressed block can be accessed without having to decompress the whole block).

Specifically, the identified UK patent applications describe methods and compression units for compressing a block of image data that comprises a plurality of image element values (e.g. colour values) that are divisible into at least a first value and a second value (e.g. a first channel colour value and a second channel colour value) such that the image data comprises at least a two-dimensional block of first values (e.g. a two-dimensional block of colour values for the first colour channel) and a two-dimensional block of second values (e.g. a two-dimensional block of colour values for the second colour channel). Each two-dimensional block of values is compressed separately using one or more fixed-length compression algorithms.

In particular, one or more of the two-dimensional blocks of values is compressed by compressing all or a portion of the two-dimensional block of values using a fixed-length compression algorithm wherein values in the two-dimensional block (or a portion thereof) are represented by common base information and a fixed-length parameter for each value in the block (or a portion thereof) that is zero, one or more than one bits in length. A compressed block for the image data is then formed from the common base information and the fixed-length parameters. By compressing a two-dimensional block of values (or a portion thereof) using a fixed-length compression algorithm all of the values in that two-dimensional block (or the portion thereof) are represented using the same number of bits thus the portion of the compressed data that relates to a particular value can be easily identified.

However, testing has shown that some graphics processing systems may access or fetch a small block of image element values (e.g. colour values) from memory at a time instead of individual image element values. The size of the small block may be referred to herein as the minimum image element value fetch size. For example, some graphics processing systems may access a 2×2 block of image element values (e.g. colour values) at a time. The minimum image element value fetch size may be selected based on the memory burst size (i.e. the amount of memory that can be accessed via a single memory access request). In these systems, instead of compressing image element values in a manner that allows individual image element values to be accessed, it may be more efficient to compress minimum image element value fetch-sized blocks (e.g. 2×2 blocks). The inventor has identified that such small blocks can be efficiently compressed using a pattern-based compression method wherein instead of storing each image element value in the small block, the small block is encoded based on the image element value distribution pattern. Specifically, a small block can be encoded by information identifying the pattern of image element values in the block and the unique image element values. Each pattern identifies the number of unique image element values in the pattern and the location thereof.

Accordingly, described herein are methods, compression units, and graphics processing units, for compressing a block of image data comprising a two-dimensional block of image element values. The methods include (i) dividing the two-dimensional block of image element values into a plurality of sub-blocks of image element values; and (ii) encoding one or more of the sub-blocks based on the pattern of image element values in the block and the image element values of the sub-block forming the pattern. In some cases, the method may further include match encoding wherein if a set of sub-blocks with one of one or more predetermined relationships all match, one of the sub-blocks may be encoded as described above (using the pattern and the image element values of the sub-block forming the pattern) and the remaining sub-blocks in the set may be encoded by identifying the matching sub-block. The methods described herein are simple and flexible and as a result are particularly suitable for use in very low budget graphics processing units.

Figure 2:
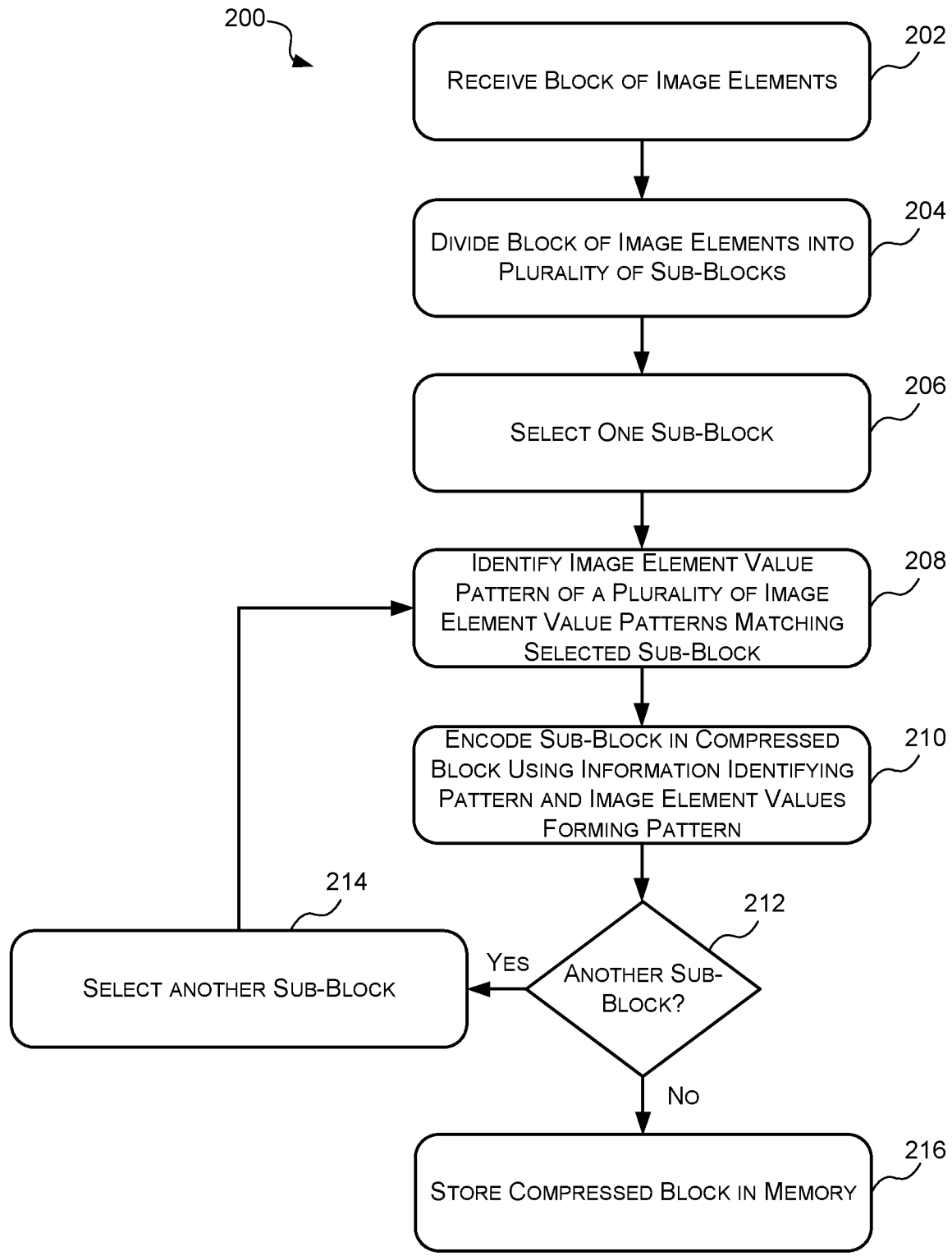
FIG. 2 is a flow diagram of an example pattern-based method for compressing a block of image data.

Reference is now made to FIG. 2 which illustrates an example pattern-based method 200 for compressing a block of image data. The method 200 begins at step 202 where a block of image data to be compressed is received.

A block of image data is the portion of the image data corresponding to a two-dimensional block of pixels or samples in the image. Accordingly, a block of image data comprises a two-dimensional block of image element values. The term 'image element value' is used herein to refer to the unit of the image data. Accordingly, the image element value is dependent on the type of image data. For example, for colour data the image element value may be a pixel value or pixel colour value (e.g. which may be defined by a set of channel colour values), or a channel colour value; for depth data the image element value may be a depth value; for surface normal data the image element value may be a surface normal direction (e.g. which may be defined by a set of values representing a unit vector or one or more angles); and for texture data the image element value may be a texel value (e.g. which may be defined by a colour value or a set of colour values). In some cases, instead of the image data corresponding to raw image data generated as part of a rasterization process, the image data may be a compressed version of the raw image data. For example, in some cases, the image data may comprise compressed pixel colour values, compressed texel values etc. In these cases, each image element value may be a compressed colour value, a compressed texel value etc.

The block of image data may be any D×E block of image element values wherein D and E are integers greater than or equal to 1. D and E may be the same, or D and E may be different. For example, the block of image data may comprise image element values for a 32×32 block of pixels, a 16×16 block of pixels or an 8×8 block of pixels. Where the compression is used to compress image data in a graphics processing system that implements tile-based rendering, the block of image data may correspond to a tile (e.g. a 32×32 block of pixels corresponding to a 32×32 pixel tile), to a set of tiles (e.g. a 32×32 block of pixels corresponding to four 16×16 pixel tiles), or to a portion of a tile (e.g. a 16×16 block of pixels corresponding to a quarter of a 32×32 pixel tile). FIG. 3 illustrates an example 8×8 block 300 of image element values that comprises one image element value ($V_{x,y}$ wherein x and y denote the row and column number respectively) for each of the sixty-four pixels in the block.

Once a block of image data has been received the method 200 proceeds to step 204.

At step 204, the block of image data is divided into a plurality of sub-blocks. Each sub-block comprises an N×M block of image element values wherein N and M are integers greater than or equal to 1. N and M may be the same, or N and M may be different. N and M may be selected using any suitable criteria, although it is desirable to keep N and M small so as to reduce the number of possible patterns of image element values in a sub-block. In some cases, N and M may be selected so that the sub-blocks correspond to the minimum block size that is fetched from memory. For example, where a graphics processing system is configured to fetch 2×2 blocks of image element values from memory, N and M may be set to 2 such that each sub-block comprises a 2×2 block of image element values. Other example sub-block sizes include, but are not limited to, 2×4, 4×2 and 4×4.

Figure 4:
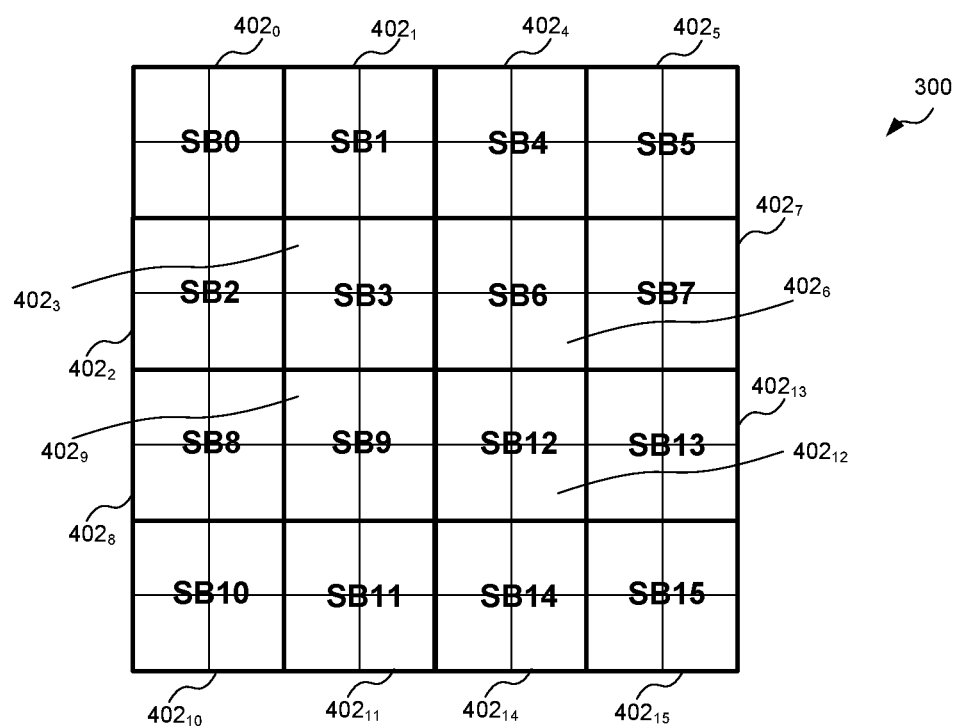
FIG. 4 is a schematic diagram of the example block of image data of FIG. 3 divided into a plurality of sub-blocks.

For example, as shown in FIG. 4, the 8×8 block 00 of image element values of FIG. 3 may be divided into sixteen 2×2 sub-blocks $402_0$-$402_{15}$ of image element values. Accordingly each sub-block $402_0$-$402_{15}$ comprises four image element values. For example, sub-block 0 (SB0) $402_0$ comprises the first two image element values in each of the first two rows ($V_{0,0}$, $V_{0,1}$, $V_{1,0}$ and $V_{1,1}$) of the 8×8 block 300 of image element values. Once the block of image data has been sub-divided into a plurality of sub-blocks of image element values, the method 200 proceeds to step 206.

At step 206, one sub-block of image element values is selected for encoding. The method 200 then proceeds to step 208. In some cases, it may be desirable to process the sub-blocks in a particular order. For example, Z-line order or scan order. It will be evident to a person of skill in the art that these are example orders only and that the sub-blocks may be processed in any suitable order.

At step 208, a determination is made as to which pattern of a plurality of image element patterns matches the pattern formed by the image element values of the selected sub-block. Each pattern has a number of image element values in the pattern and defines the location(s) of those image element values in a sub-block. Therefore a sub-block can be reconstructed from (i) the pattern; and (ii) the image element values forming the pattern.

Figure 5:
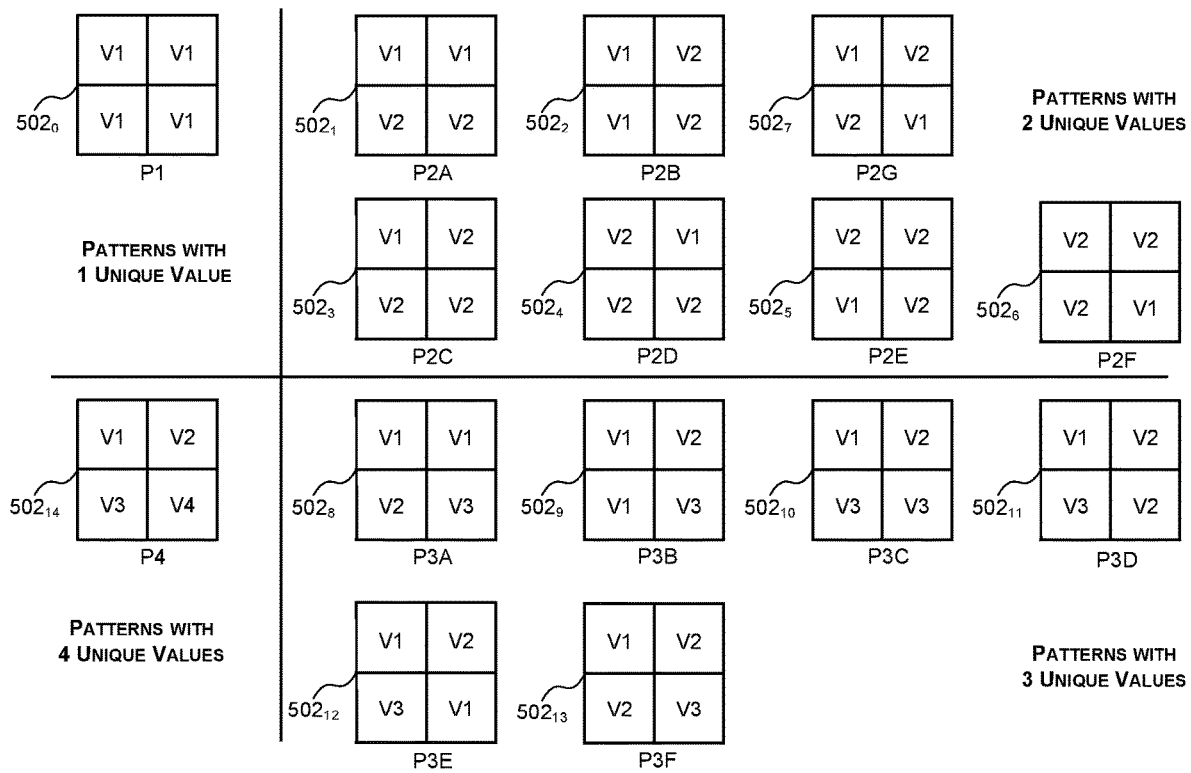
FIG. 5 is a schematic diagram of an example set of patterns for a 2×2 sub-block.

For example, FIG. 5 illustrates the fifteen possible patterns $502_0$-$502_{14}$ of image element values in a 2×2 block. The patterns have been grouped by the number of unique image element values in the pattern. Specially, there is one pattern $502_0$, referred to as the Pattern 1 (P1) pattern, that is formed of a single image element value (V1). Accordingly, the image element values of a sub-block form a P1 pattern if all of the image element values in the sub-block are the same. It is noted that with the exception of areas of constant colour, e.g. background or clear colour, colour data typically does not contain many pixel colour values that are the same. There are seven patterns $502_1$-$502_7$ that are formed of two image element values (V1, V2), which are referred to herein as Pattern 2 (P2) patterns. The Pattern 2 patterns can be divided into patterns $502_1$, $502_2$ and $502_7$ in which each of the image element values (V1, V2) appear twice in the pattern; and patterns $502_3$-$502_6$ in which one of the image element values (V1) appears once in the pattern and the other image element value (V2) appears three times in the pattern. There are six patterns $502_8$-$502_{13}$, which may be referred to herein as the Pattern 3 (P3) patterns, that are formed of three image element values (V1, V2, V3). In the P3 patterns, one of the image element values (V1, V2 or V3) appears twice in the pattern. There is only one pattern $502_{14}$, referred to as the Pattern 4 (P4) pattern, that is formed of four image element values (V1, V2, V3 and V4). Accordingly, the image element values of a sub-block form a P4 pattern if all of the image element values in the sub-block are different.

In some cases, the plurality of possible patterns which can be associated with, or matched to, a sub-block comprises all possible patterns of image element values in a sub-block (e.g. all patterns $502_0$-$502_{14}$ shown in FIG. 5). However, as described in more detail below, in some cases, the plurality of possible patterns which can be associated with a sub-block may comprise fewer than all of the possible patterns of image element values. For example, the plurality of possible patterns may not comprise uncommon patterns such as the P2G pattern in the example of FIG. 5. In these cases, if the image-element values of a sub-block do not match any of the other plurality of patterns then the sub-block will be identified as a Pk pattern wherein k is the number of image element values in a sub-block (e.g. k=4 for a 2×2 sub-block).

Figure 6:
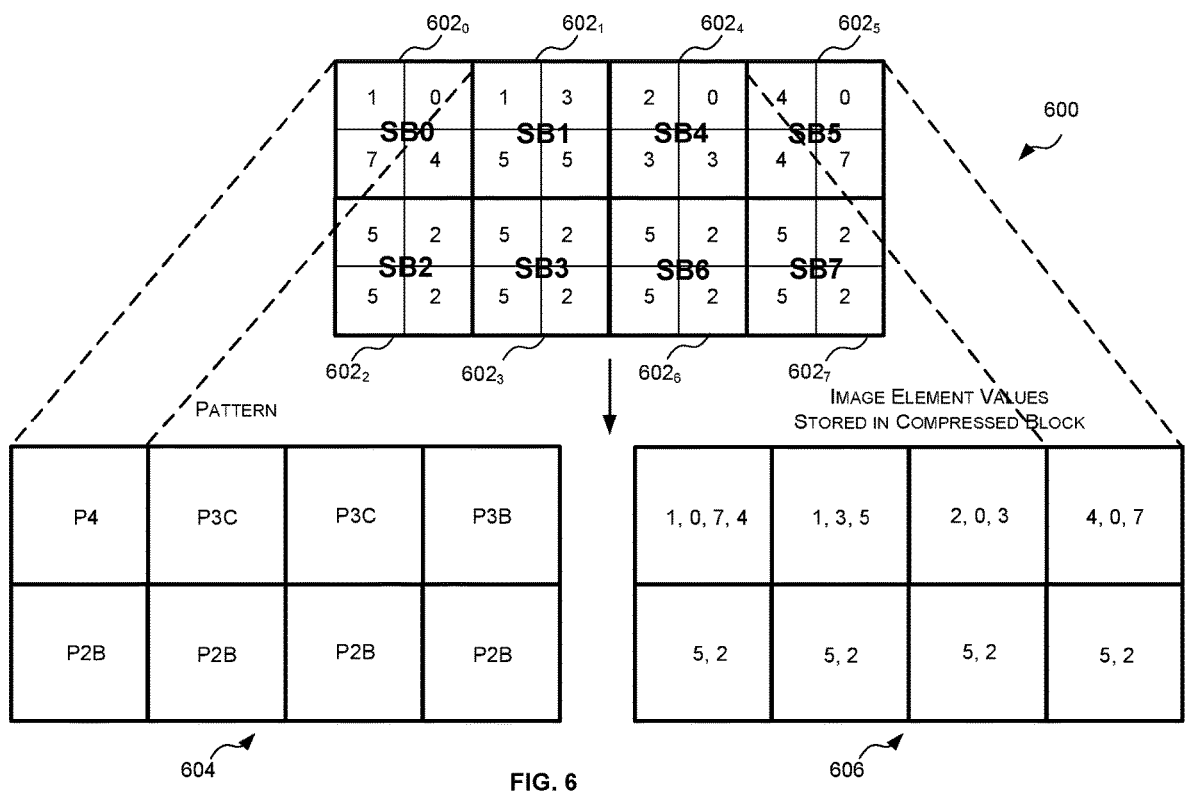
FIG. 6 is a schematic diagram illustrating compression of a block of image data using a first example pattern-based compression method.

Reference is now made to FIG. 6 which shows examples of identifying the pattern of a plurality of patterns that matches the pattern formed by the image element values of a sub-block. Specifically, FIG. 6 shows an example 4×8 block 600 of image data comprising eight 2×2 sub-blocks $602_0$-$602_7$ wherein the plurality of patterns includes all fifteen patterns $502_0$-$502_{14}$ shown in FIG. 5. In this example the image element values are between 0 and 7, but it will be evident to a person of skill in the art that this is an example only and that the image element values may have any range of values.

It can be seen that sub-block 0 (SB0 $602_0$ in FIG. 6 is associated with pattern P4 of FIG. 5 because sub-block 0 (SB0) $602_0$ comprises four unique image element values (i.e. all of the image element values in the sub-block are different); sub-blocks 1 and 4 (SB1 and SB4) $602_1$ and $602_4$ are associated with pattern P3C of FIG. 5 because they each have three unique image element values and the repeated image element value is in positions 1,0 and 1,1 of the sub-block where the position format x, y denotes the row, x, and column, y, of the sub-block; sub-blocks 2, 3, 6 and 7 (SB2, SB3, SB6 and SB7) $602_2$, $602_3$, $602_6$ and $602_7$ are associated with the pattern P2B of FIG. 5 because each of these sub-blocks have two unique image element values, the image element values in positions 0,0 and 1,0 of the sub-block are the same and the image element values in positions 0,1 and 1,1 are the same; and sub-block 5 (SB5) $602_5$ is associated with pattern P3B of FIG. 5 because the sub-block 5 (SB5) $602_5$ comprises three unique image element values and the repeated image element value is in positions 0,0 and 1,0 of the sub-block.

Returning to FIG. 2, once the pattern of the plurality of patterns which matches the pattern formed by the image element values of the selected sub-block has been identified, the method 200 proceeds to step 210.

At step 210, a compressed block is formed, or updated, so that the selected sub-block is encoded in the compressed block of image element values by (i) information identifying the pattern selected in step 208 and (ii) the image element values of the selected sub-block forming that pattern.

In some cases, the information identifying the pattern associated with the sub-block may be an index. Specifically, each of the plurality of patterns may be associated with a unique index or value. For example, Table 1 illustrates an example four-bit index and the values thereof to uniquely identify each of the fifteen patterns of FIG. 5.

TABLE 1

| Index (Binary) | Pattern |
| --- | --- |
| 0000 | P1 |
| 0001 | P2A |
| 0010 | P2B |
| 0011 | P2C |
| 0100 | P2D |
| 0101 | P2E |
| 0110 | P2F |
| 0111 | P2G |
| 1000 | P3A |
| 1001 | P3B |
| 1010 | P3C |
| 1011 | P3D |
| 1100 | P3E |

TABLE 1-continued

| Index (Binary) | Pattern |
| --- | --- |
| 1101 | P3F |
| 1110 | P4 |

The number of image element values which are stored in the compressed block to be able to reconstruct a sub-block from the pattern associated therewith is based on the number of image element values forming that pattern. For example, a P1 pattern is formed by a single image element value so a sub-block associated with a P1 pattern can be reconstructed from a single image element value (V1); a P2 pattern is formed by two image element values (V1, V2), so a sub-block associated with a P2 pattern can be reconstructed from two image element values; a P3 pattern is formed by three image element values (V1, V2, V3), so a sub-block associated with a P3 pattern can be reconstructed from three image element values; and a P4 pattern is formed by four image element values (V1, V2, V3, V4), so a sub-block associated with a P4 pattern can be reconstructed from four image element values. Accordingly, if a sub-block is associated with a pattern with less image element values than the number of image element values in the sub-block (e.g. a P1 pattern, a P2 pattern or a P3 pattern in the 2×2 sub-block example of FIG. 5) then the sub-block can be compressed by only storing that number of image element values in the compressed block. If, however, a sub-block is associated with a pattern with the same number of image element values as a sub-block (e.g. the P4 pattern in the 2×2 sub-block example), then the sub-block is not compressed and each image element value of the sub-block is stored in the compressed block.

Where the plurality of possible patterns which can be associated with, or matched to, a sub-block comprises all possible patterns of image element values in a sub-block (e.g. all fifteen patterns $502_0$-$502_{14}$ shown in FIG. 5), the number of image element values forming the pattern associated with a sub-block will be equal to the number of unique image element values in that sub-block. Accordingly, in these cases it is only unique image element values of a sub-block that may be stored in the compressed block. In other words, any image element value that appears multiple times in a sub-block may only be stored once in the compressed block. Where, however, the plurality of possible patterns which can be associated with a sub-block comprises fewer than all of the possible patterns of image element values, if the image-element values of a sub-block do not match any of the other plurality of patterns then the sub-block will be identified as a Pk pattern wherein k is the number of image element values in a sub-block (e.g. k=4 for a 2×2 sub-block) even if the sub-block does not comprise k unique image element values. In these cases, k image element values may be stored in the compressed block for a sub-block even if the sub-block comprises fewer than k unique image element values.

Reference is now made to FIG. 6 which shows which image element values may be stored in a compressed block for each of a plurality of sub-block—pattern pairs. Specifically, as described above, FIG. 6 shows an example 4×8 block 600 of image data comprising eight 2×2 sub-blocks $602_0$-$602_7$ wherein the plurality of patterns includes all fifteen patterns $502_0$-$502_{14}$ shown in FIG. 5. Each sub-block has been matched to one of the fifteen patterns of FIG. 5 as shown at 604. Specifically, it can be seen that the sub-blocks $602_0$-$602_7$ have been mapped to patterns P4, P3C, P2B, P2B, P3C, P3B, P2B, P2B respectively.

The image element values that may be stored in the compressed block for each of the sub-blocks are shown generally at 606. Specifically, sub-block 0 (SB0) $602_0$ has been associated with pattern P4 of FIG. 5 which is formed of four image element values (V1, V2, V3, V4), so each of the four image element values (1, 0, 7, 4) of the sub-block 0 (SB0) $602_0$ are stored in the compressed block; sub-block 1 (SB1) $602_1$ has been associated with pattern P3C of FIG. 5 which is formed of three image element values (V1, V2, V3), so three image element values (1, 3 and 5) are stored in the compressed block; and sub-block 2 (SB2) $602_2$ has been associated with pattern P2B of FIG. 5 which is formed of two image element values (V1, V2), so two image element values (5, 2) are stored in the compressed block. In this example then only twenty one image element values are stored in the compressed block as opposed to the thirty-two image element values that are stored in the original uncompressed block 600. This therefore reduces the number of image element values by 34%.

Returning to FIG. 2, in some cases, the method 200 may end after step 210. However, in other cases one or more other sub-blocks may be encoded in a similar manner. If one or more other sub-blocks are also to be encoded, then the method 200 may proceed to step 212.

At step 212, a determination is made as to whether there is another sub-block to be encoded or compressed. If there is at least one sub-block still to be encoded or compressed, then the method 200 proceeds to step 214. If, however, there are no more sub-blocks still to be encoded then the method 200 may proceed to step 216 where the compressed block is output and/or stored in memory (e.g. a frame buffer).

At step 214, one of the remaining sub-blocks to be encoded is selected. The method 200 then proceeds back to steps 208 and 210 where the pattern identification and the sub-block encoding is performed on the selected sub-block. Once all of the desired sub-blocks have been encoded the method 200 may proceed to step 216 where the compressed block is output and/or stored in memory.

An example format for a compressed block generated in accordance with the method 200 of FIG. 2 will be described below with reference to FIG. 13.

Correlation Between Sub-Blocks

In many cases, not only are there common image element values in a sub-block, but there are often common sub-blocks within a block, particularly sub-blocks that are in close proximity. Accordingly, in some cases, in addition to compressing a block of image data based on patterns within sub-blocks thereof, the compression may also take advantage of the similarity or correlation between sub-blocks.

Specifically, in some cases, the method of FIG. 2 may further comprise determining whether a sub-block is the same as, or matches, one or more other sub-blocks in the block. Two sub-blocks are said to be the same, or match, if they comprise the same image element values in each position of the sub-block. If it is determined that a sub-block is the same as, or matches, one or more other sub-blocks in the block, that sub-block is encoded in the compressed block, not by information identifying a pattern and the image element values forming that pattern, but with information identifying the matching sub-block(s). The information identifying the matching sub-block acts as a pointer to the pattern and image element values that can be used to reconstruct the sub-block. Accordingly, no image element values need to be stored in the compressed block for this sub-block as they have already been stored in the compressed block. Where there are a lot of duplicate, or matching, sub-blocks in a block this can significantly increase the compression ratio for the block.

In some cases, the method of FIG. 2 may further comprise comparing two sub-blocks that have a predetermined relationship to determine if they are the same, or match. Then if they are the same, or match, one of the sub-blocks can be encoded as described above (e.g. using the pattern and image element values forming the pattern) and the other sub-block can be encoded as a match to the other sub-block.

For example, the sub-blocks may be ordered (e.g. in Morton (or Z) order (as shown in FIG. 4), in scan line order or in another manner) and the method of FIG. 2 may further comprise determining whether a sub-block matches the previous sub-block in the order. If a sub-block matches the previous sub-block in the order, then that sub-block is encoded in the compressed block by information indicating that that the sub-block matches the previous sub-block. For example, if the sub-blocks $402_0$-$402_{15}$ of FIG. 4 are ordered in Morton (or Z) order from 0 to 15 and sub-block 1 (SB1) $402_1$ is received for encoding, it may be determined whether sub-block 1 (SB1) $402_1$ matches sub-block 0 (SB0) $402_0$ (the previous sub-block in the order). If it is determined that sub-block 1 (SB1) $402_1$ matches sub-block 0 (SB0) $402_0$, then sub-block 1 (SB1) $402_1$ may be encoded in the compressed block by information indicating that the sub-block matches the previous block. A sub-block that is the same as, or matches, the previous sub-block in the order may be referred to as a match-1 (M-1) sub-block. The information indicating that a sub-block is an M-1 sub-block acts as a pointer to the pattern and image element values associated with the previous sub-block so that on decompression the pattern and image element values associated with the previous sub-block are retrieved and used to reconstruct that sub-block.

Figure 7:
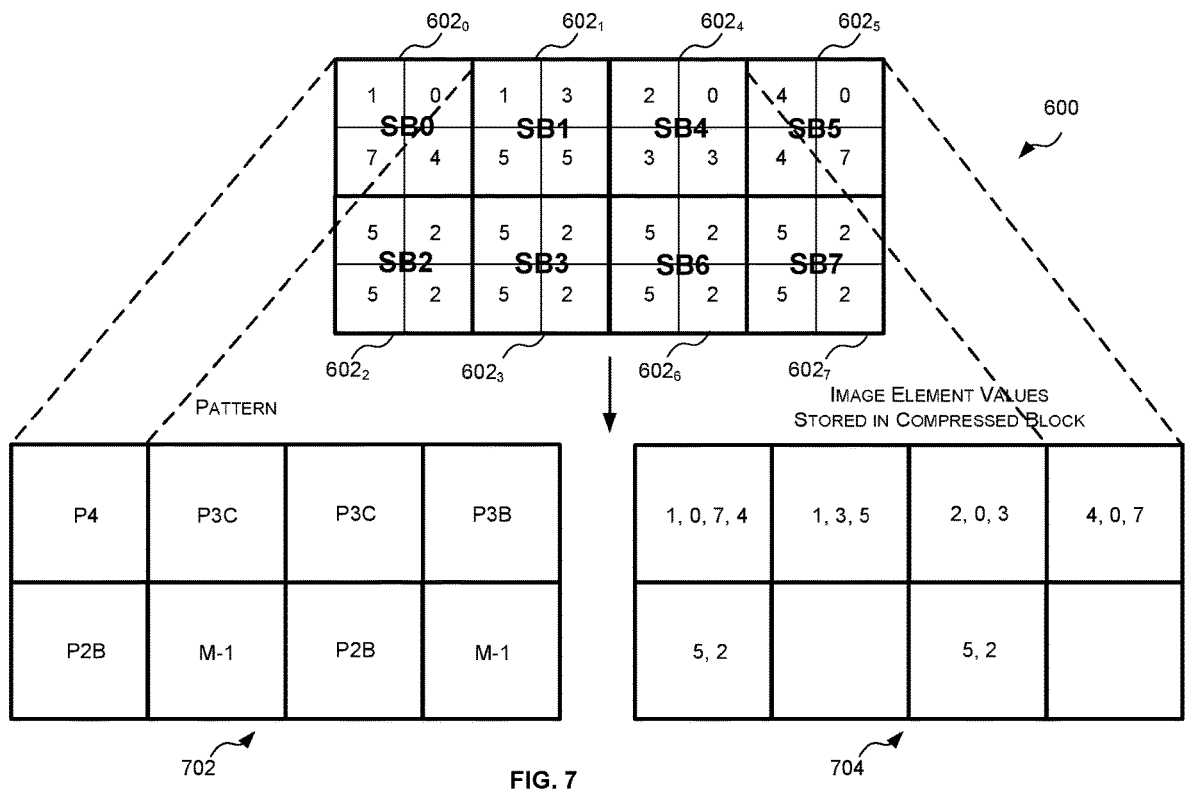
FIG. 7 is a schematic diagram illustrating compression of the block of image data of FIG. 6 using a second example pattern-based compression method.

Reference is now made to FIG. 7 which illustrates how identifying a sub-block that matches the preceding sub-block (according to an ordering of the sub-blocks in a block) can increase the compression ratio of a block. Specifically, FIG. 7 illustrates the example block 600 of image data (i.e. image element values) of FIG. 6. In FIG. 6 each sub-block $602_0$-$602_7$ was associated with a pattern (shown at 604) and the image element values of the sub-block forming that pattern were stored in the compressed block (shown at 606). Therefore in FIG. 6 each sub-block was compressed independently of the other sub-blocks based on the pattern associated therewith resulting in at least one image element value being stored in the compressed block for each sub-block. In contrast, in FIG. 7 the relationship between sub-blocks was taken into account when compressing the block—i.e. any sub-block that matched the preceding block (according to an ordering of the sub-blocks) was simply identified as a match-1 (M-1) sub-block in the compressed block and no image element values were stored in the compressed block for that sub-block. Specifically, sub-block 3 (SB3) $602_3$ matches the previous sub-block (sub-block 2 (SB2) $602_2$) so instead of encoding sub-block 3 (SB3) $602_3$ in the compressed block using the pattern (P2B) and the image element values that form the pattern, sub-block 3 (SB3) is simply identified as a match-1 (M-1) sub-block (shown at 702). So no image element values are stored for sub-block 3 (SB3) (shown at 704). As described above, the match-1 (M-1) designation acts as a pointer to the pattern and image element values of the previous sub-block (sub-block 2 (SB2) $602_2$). The pattern and image element values of the previous sub-block can then be retrieved and used to reconstruct sub-block 3 (SB3) $602_3$. Similarly, sub-block 7 (SB7) $602_7$ matches the previous sub-block (sub-block 6

(SB6) $602_6$) so instead of encoding sub-block 7 (SB7) $602_7$ using the pattern (P2B) and the image element values forming the pattern, sub-block 7 (SB7) $602_7$ is simply identified as a match-1 (M-1) sub-block (shown at 702). This reduces the number of image element values stored in the compressed block down to 17 which reduces the number of image element values stored in the compressed block, compared to the uncompressed block 600, by 47%.

In other cases, where the sub-blocks are ordered (e.g. in Morton (or Z) order (as shown in FIG. 4), in scan line order or in another manner) the method of FIG. 2 may additionally, or alternatively comprise determining whether a sub-block J matches the sub-block preceding the previous sub-block in the order (i.e. the sub-block two back in the order). If it is determined that the sub-block J matches the sub-block preceding the previous sub-block in the order, the sub-block J is encoded in the compressed block with information indicating that the sub-block matches the sub-block preceding the previous sub-block in the order. For example, if the sub-blocks $402_0$-$402_{15}$ of FIG. 4 are ordered in Morton (or Z) order from 0 to 15 and sub-block 2 (SB2) $402_2$ is received for encoding, it may be determined whether sub-block 2 (SB2) $402_2$ matches sub-block 0 (SB0) $402_0$ (the sub-block preceding the previous sub-block in the order). If it is determined that sub-block 2 (SB2) $402_2$ matches sub-block 0 (SB0) $402_0$ then sub-block 2 (SB2) $402_2$ may be encoded in the compressed block by information indicating that the sub-block matches the sub-block preceding the previous sub-block in the order. A sub-block that is the same as, or matches, the sub-block preceding the previous sub-block in the order may be referred to as a match-2 (M-2) sub-block. Similar to the match-1 (M-1) case, the information indicating that the sub-block is an M-2 sub-block acts as a pointer to the pattern and image element values associated with the sub-block preceding the previous sub-block in the order, so that on decompression, the pattern and image element values associated with the sub-block preceding the previous sub-block are retrieved from the compressed block and used to reconstruct the relevant sub-block.

In yet other cases, instead of comparing two sub-blocks to see if they match, the method of FIG. 2 may further comprise determining whether a set of sub-blocks, which have one of one or more predetermined relationships, are all the same, or all match. If the set of sub-blocks all match, then one of the sub-blocks in the set may be encoded as described above (using the pattern and image element values forming the pattern) and the remainder of the sub-blocks in the set may each be encoded by information identifying them as forming part of a matching set having the predetermined relationship. The information identifying a sub-block as forming part of a matching set of sub-blocks having a predetermined relationship may act as a pointer to the sub-block in the set that has been pattern encoded. In this way the pattern and image element values stored in the compressed block for that sub-block can then be used to reconstruct any sub-block in the set. Accordingly, no image element values need to be stored in the compressed block for the other sub-blocks in the set.

Figure 8:
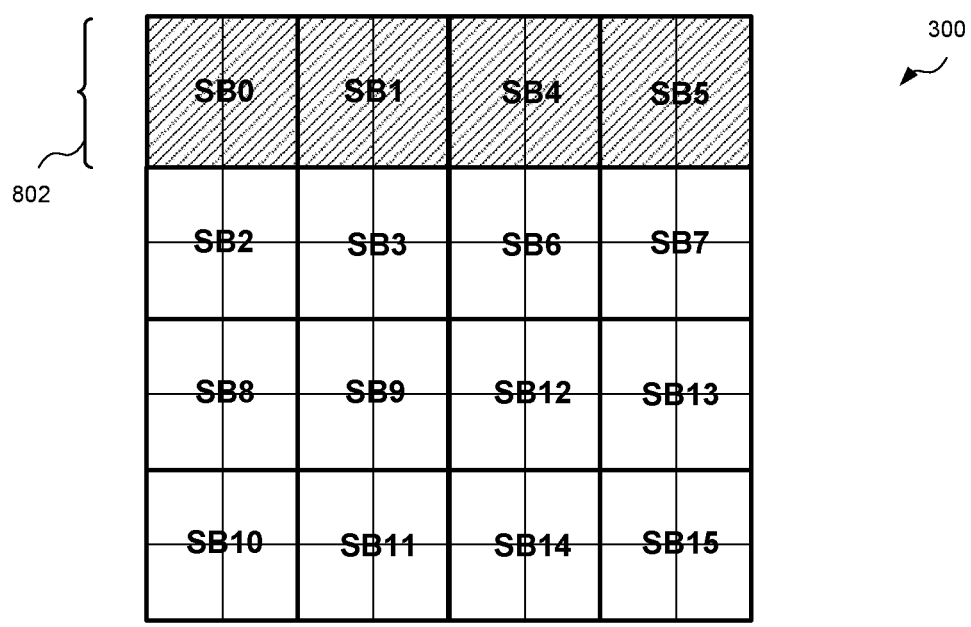
FIG. 8 is a schematic diagram illustrating an example set of sub-blocks forming a row of sub-blocks.
Figure 9:
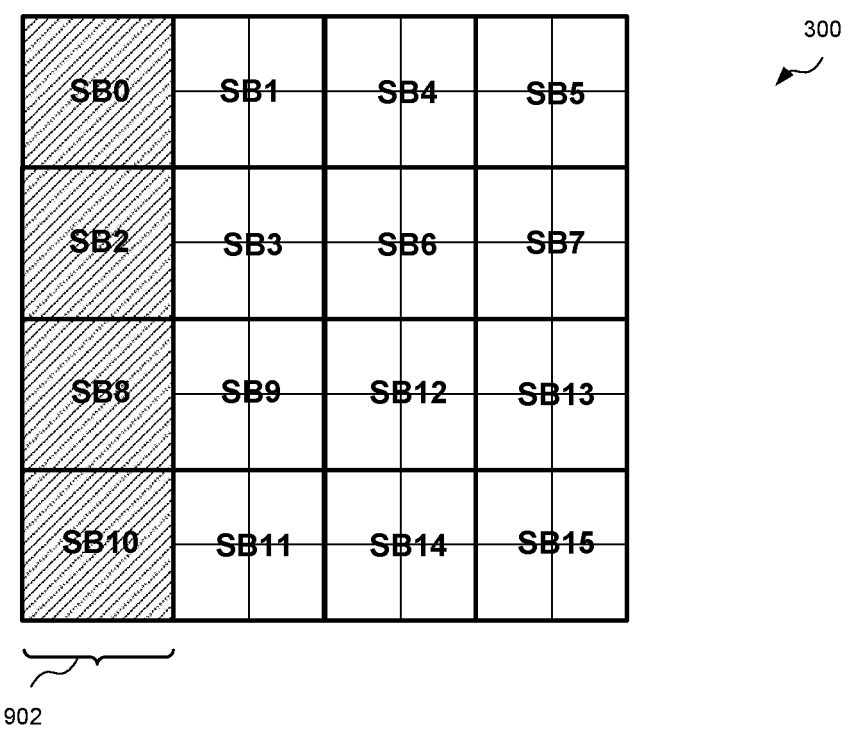
FIG. 9 is a schematic diagram illustrating an example set of sub-blocks forming a column of sub-blocks.
Figure 10:
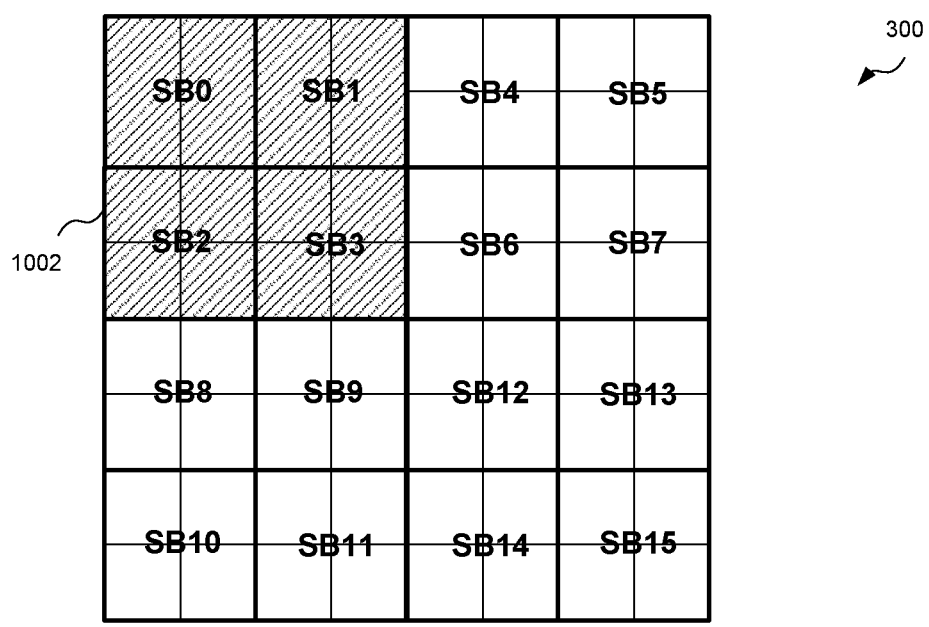
FIG. 10 is a schematic diagram illustrating an example set of sub-blocks forming a 2×2 block of sub-blocks.

The predetermined relationships between sub-blocks may be selected so as to include sets or groups of sub-blocks that are likely to be the same. For example, a set of sub-blocks may have a predetermined relationship if, for example, the set of sub-blocks form (i) a row of sub-blocks 802 as shown in FIG. 8, (ii) a column of sub-blocks 902 as shown in FIG. 9; or (iii) an A×B block of sub-blocks 1002 wherein A and B are integers greater than or equal to 1 (e.g. a 2×2 block of sub-blocks) as shown in FIG. 10. One sub-block in a row of matching sub-blocks may be encoded via a pattern and image element values forming the pattern, and each of the other sub-blocks in the row may simply be identified as a match row (MR) sub-block. Similarly, one sub-block in a column of matching sub-blocks may be encoded via a pattern and image element values forming the pattern, and each of the other sub-blocks in the column may simply be identified as a match column (MC) sub-block. If a sub-block belongs to two or more matching groups of sub-blocks (e.g. if a sub-block is both a row matching sub-block and a column matching sub-block) then the sub-block may be associated with any one of the matching groups (e.g. the sub-block may be identified as a MR sub-block or as a MC sub-block). It will be evident to a person of skill in the art that these are only example sub-block relationships and other sub-block relationships may be used.

In some cases, each set of sub-blocks which can be compressed in this manner may be identified by a mask. For example, if a row of sub-blocks can be compressed in this manner, the first row of sub-blocks of FIG. 4 (SB0, SB1, SB4, SB5) may be identified by the hexadecimal mask 0x0033, the second row of sub-blocks of FIG. 4 (SB2, SB3, SB6, SB7) may be identified by the hexadecimal mask 0x00CC, the third row of sub-blocks of FIG. 4 (SB8, SB9, SB12 and SB13) may be identified by the hexadecimal mask 0x3300, and the fourth row of sub-blocks of FIG. 4 (SB10, SB11, SB14 and SB15) may be identified by the hexadecimal mask 0xCC00. Similarly, if a column of sub-blocks can be compressed in this manner, the first column of sub-blocks of FIG. 4 (SB0, SB2, SB8, SB10) may be identified by the hexadecimal mask 0x0505, the second column of sub-blocks of FIG. 4 (SB1, SB3, SB9, SB11) may be identified by the hexadecimal mask 0x0A0A, the third column of sub-blocks of FIG. 4 (SB4, SB6, SB12, SB14) may be identified by the hexadecimal mask of 0x5050, and the fourth column of sub-blocks of FIG. 4 (SB5, SB7, SB13, SB15) may be identified by the hexadecimal mask of 0xA0A0.

Figure 11:
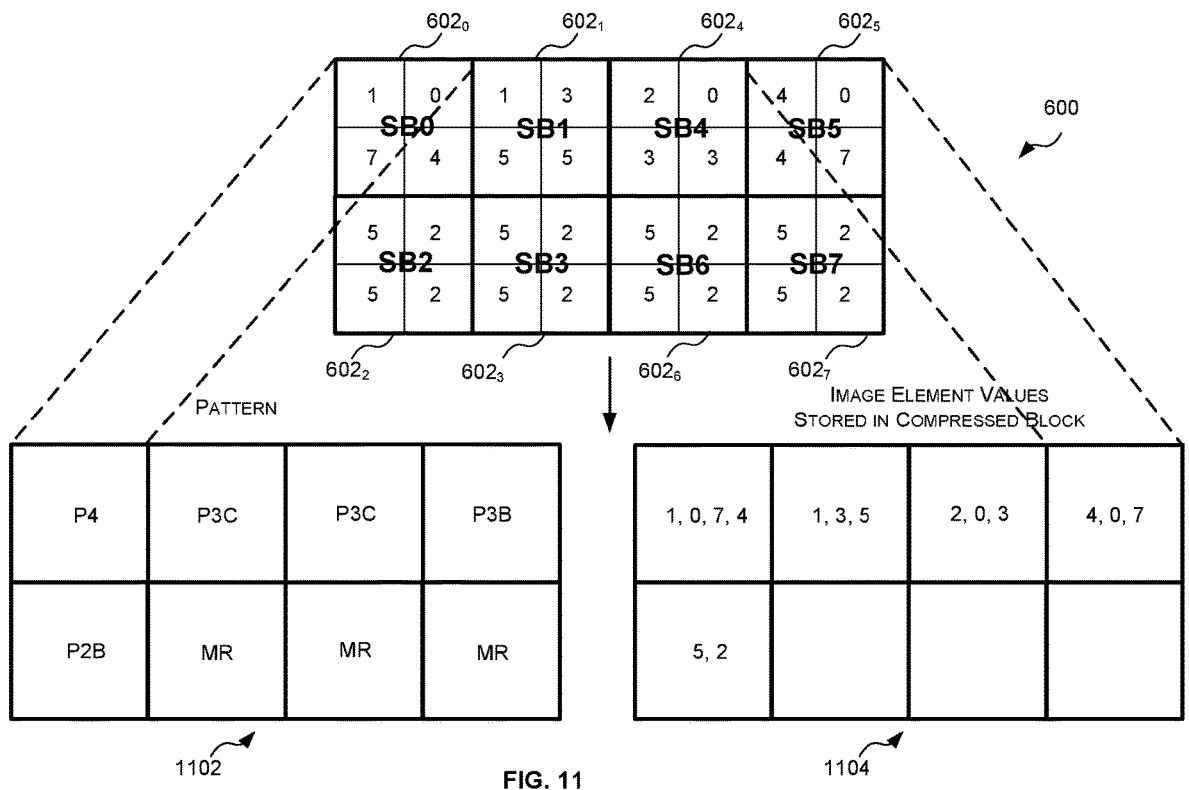
FIG. 11 is a schematic diagram illustrating compression of the block of image data of FIG. 6 using a third example pattern-based compression method.

Reference is now made to FIG. 11 which illustrates how identifying a matching set of sub-blocks can increase the compression ratio of a block of image element values. Specifically, FIG. 11 illustrates the example block 600 of image data (i.e. image element values) of FIG. 6. In FIG. 6 each sub-block $602_0$-$602_7$ was associated with a pattern (shown at 604) and the image element values of the sub-block forming that pattern were stored in the compressed block (shown at 606). Therefore in FIG. 6 each sub-block was compressed independently of the other sub-blocks based on the pattern associated therewith resulting in at least one image element value being stored in the compressed block for each sub-block. In contrast, in FIG. 11 the relationship between sub-blocks was taken into account when compressing the block—i.e. for any row of matching sub-blocks, the first sub-block in the row was identified by a pattern and the image element values forming that pattern, and each other sub-block in the row was simply identified as a match row (MR) sub-block in the compressed block and no image element values were stored in the compressed block for those sub-blocks.

Specifically, the second row of sub-blocks ($602_2$, $602_3$, $602_6$ and $602_7$) are all the same. So, instead of encoding each sub-block in the row with the P2B pattern and the two image element values that form that pattern (5,2), the first sub-block in the row (sub-block 2 (SB2) $602_2$) is encoded with the P2B pattern and the two image element values that form that pattern (5,2), and each other sub-block in the row (sub-blocks 3, 6 and 7 (SB3, SB6, SB7) $602_3$, $602_6$ and $602_7$) is simply identified as a match row (MR) sub-block (shown at 1102). So no image element values are stored for the last three sub-blocks (602₃, 602₆ and 602₇) in the that row (shown at 1104). As described above, the match row (MR) designation acts as a pointer to the pattern and image element values of the first sub-block in the row (i.e. sub-block 2 (SB2) 602₂). The pattern and image element values of the first sub-block in the row can then be retrieved and used to reconstruct any of the sub-blocks in the row (602₂, 602₃, 602₆ and 602₇). This reduces the number of image element values stored in the compressed block down to 15 which reduces the number of image element values stored in the compressed block, compared to the uncompressed block 600, by 53%.

Number of Patterns

In some cases, a fixed number of bits may be used in the compression block to identify the encoding format of a sub-block. Where a sub-block is pattern encoded this may comprise identifying the pattern associated with the sub-block; and where a sub-block is match encoded this may comprise identifying the match type. The number of bits per sub-block used to identify the encoding format may then be based on the number of patterns and the number of matching types supported by the compression algorithm. For example, if a compression algorithm only supports pattern encoding and there are fifteen patterns, then at least 4 bits is required per sub-block to uniquely identify the encoding format of a sub-block. Table 1, shown above, illustrates an example of how four bits can be used to uniquely identify fifteen patterns. If, however, the compression algorithm supports pattern encoding with fifteen patterns and four matching types then at least five bits are required per sub-block to uniquely identify the encoding format. Table 2 illustrates an example of how five bits can be used to identify fifteen patterns and four match types.

TABLE 2

| Encoding Format | Pattern |
|---|---|
| 00000 | P1 |
| 00001 | P2A |
| 00010 | P2B |
| 00011 | P2C |
| 00100 | P2D |
| 00101 | P2E |
| 00110 | P2F |
| 00111 | P2G |
| 01000 | P3A |
| 01001 | P3B |
| 01010 | P3C |
| 01011 | P3D |
| 01100 | P3E |
| 01101 | P3F |
| 01110 | P4 |
| 01111 | M-1 |
| 10000 | M-2 |
| 10001 | MR |
| 10010 | MC |

In some cases, to reduce the number of bits per sub-block to identify the encoding format thereof, the number of patterns supported by the compression algorithm may not include all of the possible patterns. For example, instead of the compression algorithm supporting all fifteen patterns of FIG. 5, the compression algorithm may support less than fifteen patterns. Where a pattern is not supported by the compression algorithm then sub-blocks that have that pattern can be represented by a Pk pattern where k is the number of image element values in a sub-block (i.e. in uncompressed form). So, in some cases, a higher compression ratio may be achieved by using fewer patterns and/or match types.

Figure 12:
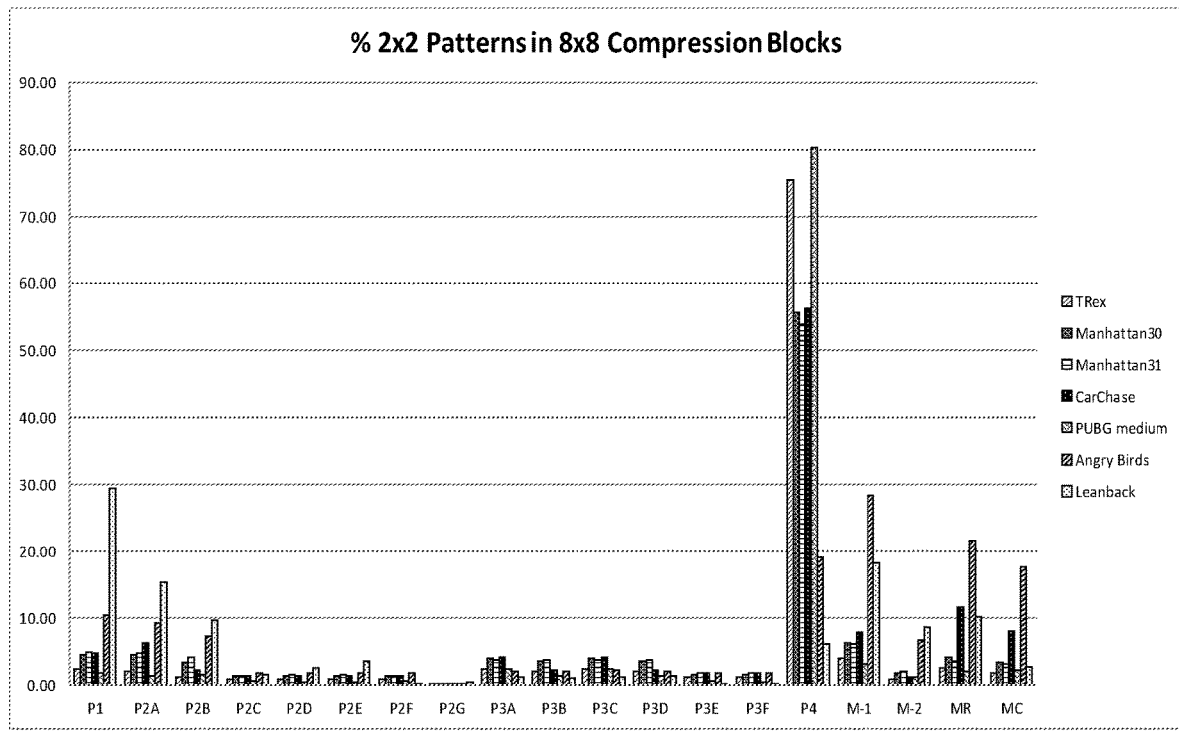
FIG. 12 is a graph illustrating the frequency of the 2×2 patterns of FIG. 5 for a plurality of benchmarks.

In some cases, the least common patterns may not be supported by the compression algorithm. For example, the graph of FIG. 12 shows the frequency of the 2×2 patterns shown in FIGS. 5 and M-1, M-2, MR and MC matching types for 8×8 blocks of colour values for seven different benchmarks. It can be seen from FIG. 12 that the number of 2×2 sub-blocks that have a P2G pattern is very limited. This is because in a P2G pattern the same colour values are diagonal to each other, instead of being adjacent to each other like they are in the other P2 patterns. This may occur when two thin lines cross each other, but this is rare in a colour block. Similarly, it can be seen in FIG. 12 that 2×2 sub-blocks with a P3E or P3F pattern are also quite limited. This may occur as a result of a thin line crossing one or two primitives. In contrast, FIG. 12 shows that a significant number of sub-blocks can be encoded using a M-1, M-2, MR and MC match types.

Accordingly, to keep the number of encoding bits per sub-block to four, the P2G, P3E and P3F patterns may not be supported, but four matching types (e.g. M-1, M-2, MR, MC) may be supported. Table 3 illustrates an example of how four bits can be used to identify twelve patterns and four match types.

TABLE 3

| Encoding Format | Pattern |
|---|---|
| 0000 | P1 |
| 0001 | P2A |
| 0010 | P2B |
| 0011 | P2C |
| 0100 | P2D |
| 0101 | P2E |
| 0110 | P2F |
| 0111 | P3A |
| 1000 | P3B |
| 1001 | P3C |
| 1010 | P3D |
| 1011 | P4 |
| 1100 | M-1 |
| 1101 | M-2 |
| 1110 | MR |
| 1111 | MC |

Example Compressed Block Formats

Example formats for the compressed blocks generated in accordance with the method 200 of FIG. 2 will now be described.

Figure 13:
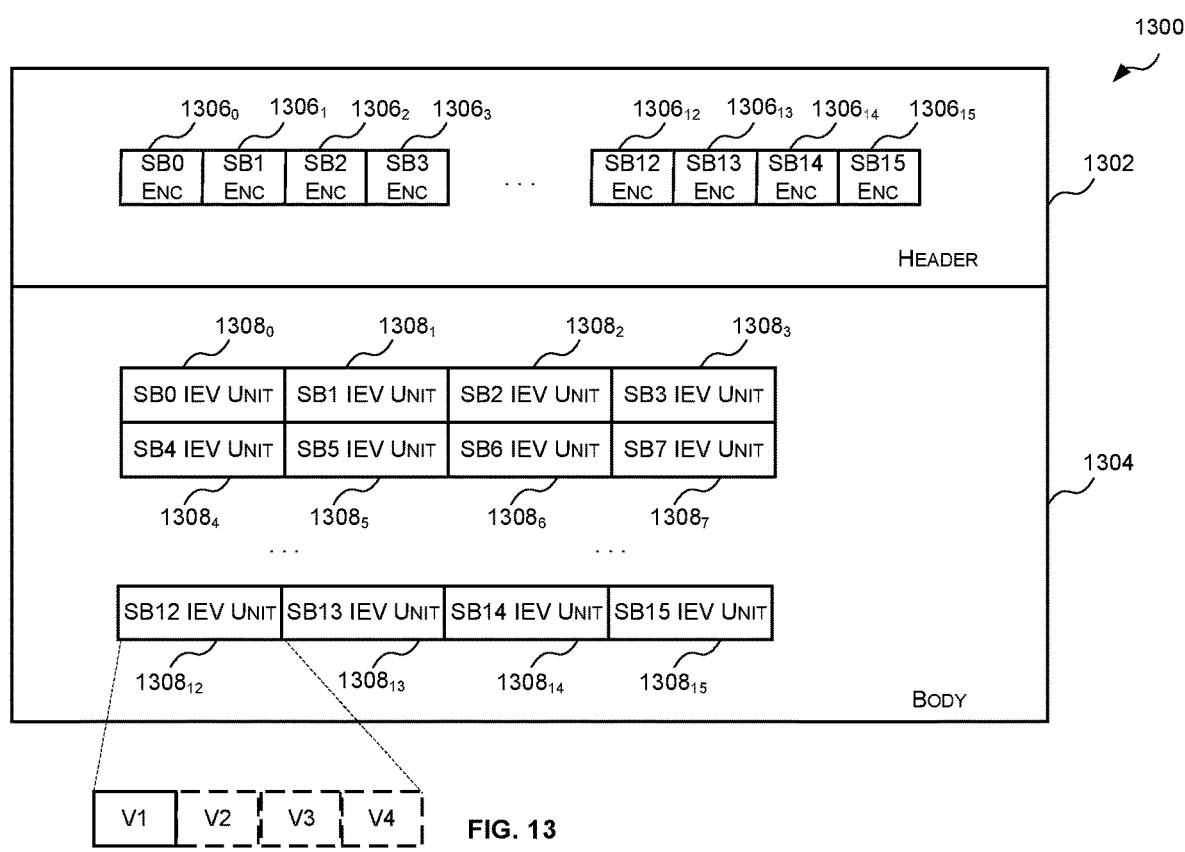
FIG. 13 is a schematic diagram illustrating an example format for a compressed block of image data.

Reference is now made to FIG. 13 which illustrates an example format for a compressed block 1300 of image data where the block is divided into sub-blocks and one or more of the sub-blocks is compressed using a pattern-based encoding scheme. In this example the block is an 8×8 block of image element values that is divided into sixteen 2×2 sub-blocks of image element values, however, it will be evident to a person of skill in the art that this is an example only and that the method and techniques described herein may be applied to image data of any size that is divided into any sized sub-blocks.

The example compressed block 1300 comprises a header 1302 and a body 1304. The header 1302 comprises information identifying the encoding format (e.g. pattern or matching type) for each sub-block. The body 1304 comprises the image element values that can be used to reconstruct the sub-blocks from the information in the header 1302.

In FIG. 13 the header 1302 comprises a fixed-length encoding format field $1306_0$-$1306_{15}$ for each sub-block that indicates or identifies the encoding format for that sub-block. Specifically, the sub-block 0 encoding format field (SB0 ENC) $1306_0$ identifies the encoding format of sub-block 0, the sub-block 1 encoding format field (SB1 ENC) $1306_1$ identifies the encoding format of sub-block 1, the sub-block 2 encoding format field (SB2 ENC) $1306_2$ identifies the encoding format of sub-block 2 and so on. Where sub-blocks can be encoded using only pattern-based encoding then the encoding format field $1306_0$-$1306_{15}$ identifies the pattern used to encode the sub-block. Where sub-blocks can be encoded using pattern-based encoding or matching encoding then if the sub-block was pattern encoded the encoding format field $1306_0$-$1306_{15}$ may identify the pattern used to encode the sub-block, and if the sub-block was match encoded the encoding format field $1306_0$-$1306_{15}$ may identify the type of matching (e.g. column-based matching, row-based matching etc.) In some cases, the encoding format field $1306_0$-$1306_{15}$ may comprise a value that indicates the relevant pattern or match type. Example 4-bit and 5-bit values which can be used to identify patterns and/or matching types were described above with respect to Tables 1 to 3.

The body 1304 comprises an image element value unit $1308_0$-$1308_{15}$ for each sub-block that is pattern-encoded (i.e. each sub-block that is associated with a pattern in the header 1302). Each image element value (IEV) unit $1308_0$-$1308_{15}$ comprises the image element values (V1, V2, V3, V4) that form the associated pattern. As described above, the number of image element values that are stored in the compressed block 1300 for any particular sub-block will be based on the number of image element values that form the associated pattern. For example a P1 pattern is formed by one image element value (V1), so a sub-block that is encoded using a P1 pattern may have an image element value (IEV) unit $1308_0$-$1308_{15}$ in the body 1304 that comprises one image element value (V1). Similarly a P3 pattern is formed by three image element values (V1, V2, V3), so a sub-block that is encoded using a P3 pattern may have an image element value unit $1308_0$-$1308_{15}$ in the body 1304 that comprises three image element values (V1, V2, V3). There may not be an image element value unit $1308_0$-$1308_{15}$ in the body for any match-encoded sub-blocks as the relevant image element values will already be in the body 1304.

The image element value units $1308_0$-$1308_{15}$ may be packed in the body 1304 in any suitable order. Preferably the image element value (I EV) units are packed in the body 1304 in the same order that the encoding format fields $1306_0$-$1306_{15}$ are packed in the header 1302. For example, if the first encoding format field $1306_0$ in the header 1302 corresponds to sub-block 0, and the second encoding format field $1306_1$ in the header 1302 corresponds to sub-block 1 then the image element value (IEV) unit for sub-block 0 may be stored first in the body 1304, and the image element value (IEV) unit for sub-block 1 may be stored in the body 1304 next.

Figure 14:
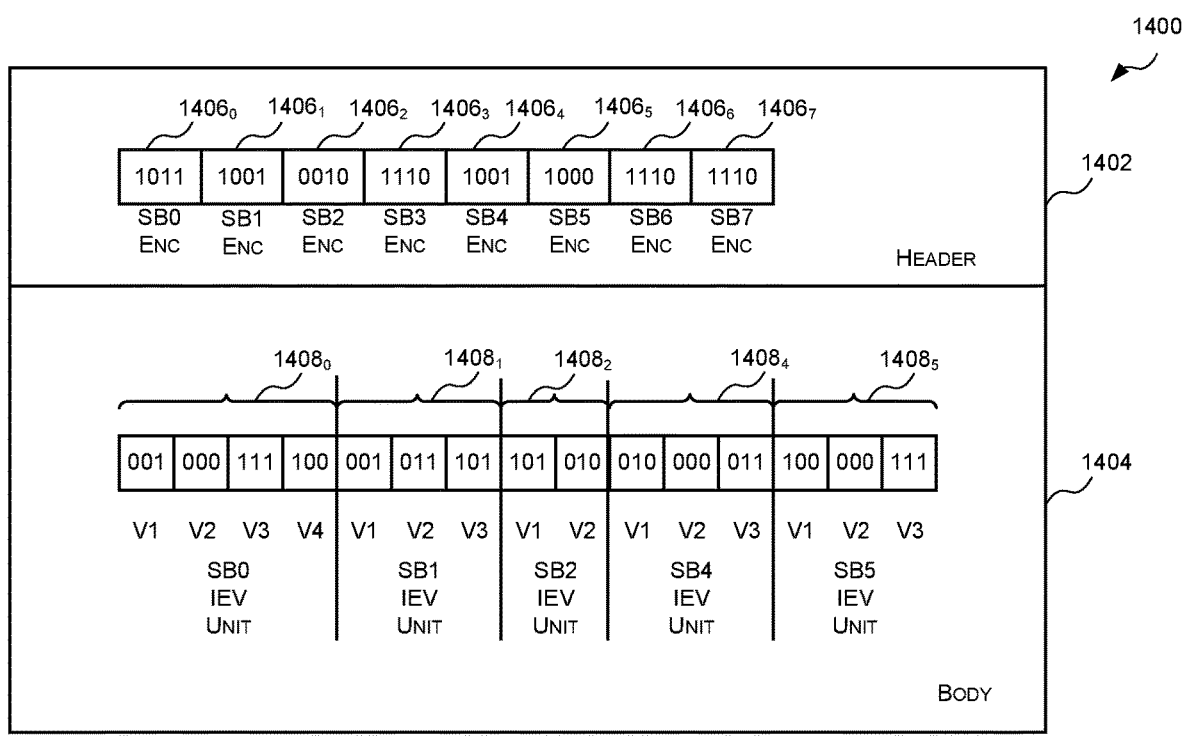
FIG. 14 is a schematic diagram illustrating an example compressed block of image data for the block of image data of FIG. 6.

Reference is now made to FIG. 14 which illustrates an example compressed block 1400 for the example 2×4 block 600 of image data (i.e. image element values) of FIG. 11 which has been encoded as shown in FIG. 11 by a version of the method of FIG. 2 where the block 600 of image data is divided into a plurality of 2×2 sub-blocks and there are twelve possible 2×2 patterns (P1, P2A, P2B, P2C, P2D, P2E, P2F, P3A, P3B, P3C, P3D, P4 of FIG. 5) and four possible matching types (M-1, M-2, MR, MC) which are uniquely identified using the values shown in Table 3. The compressed block 1400 comprises a header 1402 and a body 1404.

The header 1402 comprises an encoding format field $1406_0$-$1406_7$ for each of the eight sub-blocks $602_0$-$602_7$. Each encoding format field $1406_0$-$1406_7$ identifies the encoding format of the corresponding sub-block. In this example each encoding format field $1406_0$-$1406_7$ comprises a value which identifies a pattern or matching type used to encode the corresponding sub-block in accordance with Table 3. Specifically, sub-block 0 (SB0) $602_0$ is encoded using the P4 pattern so the encoding format field $1406_0$ for sub-block 0 is set to '1011' as per Table 3; sub-block 1 (SB1) $602_1$ is encoded using the P3C pattern so the encoding format field $1406_1$ for sub-block 1 (SB1) $602_1$ is set to '1001' as per Table 3; sub-block 2 (SB2) $602_2$ is encoded using the P2B pattern so the encoding format field $1406_2$ for sub-block 2 (SB2) $602_2$ is set to '0010' as per Table 3; sub-block 3 (SB3) $602_3$ is encoded using row matching (MR) so the encoding format field $1406_3$ for sub-block 3 (SB3) $602_3$ is set to '1110' as per Table 3; sub-block 4 (SB4) $602_4$ is encoded using the P3C pattern so the encoding format field $1406_4$ for sub-block 4 (SB4) $602_4$ is set to '1001' as per Table 3; sub-block 5 (SB5) $602_5$ is encoded using the P3B pattern so the encoding format field $1406_5$ for sub-block 5 (SB5) $602_5$ is set to '1000' as per Table 3; sub-block 6 (SB6) $602_6$ is encoded using row matching (MR) so the encoding format field $1406_6$ for sub-block 6 (SB6) $602_6$ is set to '1110' as per Table 3; and sub-block 7 (SB7) $602_7$ is encoded using row matching (MR) so the encoding format field $1406_7$ for sub-block 7 (SB7) $602_7$ is set to '1110' as per Table 3.

The body 1404 comprises an image element value (IEV) unit $1408_0$, $1408_1$, $1408_2$, $1408_4$, $1408_5$ for each sub-block that is pattern encoded. In this example, since sub-blocks 0, 1, 2, 4 and 5 are pattern encoded there is an IEV unit $1408_0$, $1408_1$, $1408_2$, $1408_4$, $1408_5$ for each of these sub-blocks in the body 1404. Sub-blocks 3, 6 and 7 $602_3$, $602_6$, $602_7$ are not pattern encoded (i.e. they are match encoded) so the body 1404 does not include an IEV unit for these sub-blocks.

As described above, each IEV unit $1408_0$, $1408_1$, $1408_2$, $1408_4$, $1408_5$ comprises the image element values forming the pattern associated with the corresponding sub-block. The number of image element values stored in an IEV unit is thus dependent on the number of image element values forming the associated pattern. Specifically, sub-block 0 (SB0) $602_0$ is encoded using a P4 pattern which is formed of four image element values (V1, V2, V3, V4) so the IEV unit $1408_0$ for sub-block 0 (SB0) $602_0$ comprises four image element values (1, 0, 7 and 4); sub-blocks 1, 4 and 5 $602_1$, $602_4$ and $602_5$ are each encoded using a P3 pattern which is formed of three image element values (V1, V2, V3) so the IEV units $1408_1$, $1408_4$, and $1408_5$ for sub-blocks 1, 4 and 5 each comprise three image element values (1, 3, 5; 2, 0, 3; and 4, 0, 7); and sub-block 2 (SB2) $602_2$ is encoded using a P2 pattern which is formed of two image element values (V1, V2) so the IEV unit $1408_2$ for sub-block 2 (SB2) $602_2$ comprises two image element values (5, 2).

In some cases, the headers and/or bodies of a plurality of compressed blocks may be packed together in memory to make more efficient use of the memory. For example, if each compressed block corresponds to an 8×8 block of image element values, then the headers and/or bodies of the compressed blocks corresponding to a 32×32 block of image element values may be packed together to improve the efficiency of memory usage and bandwidth.

Figure 15:
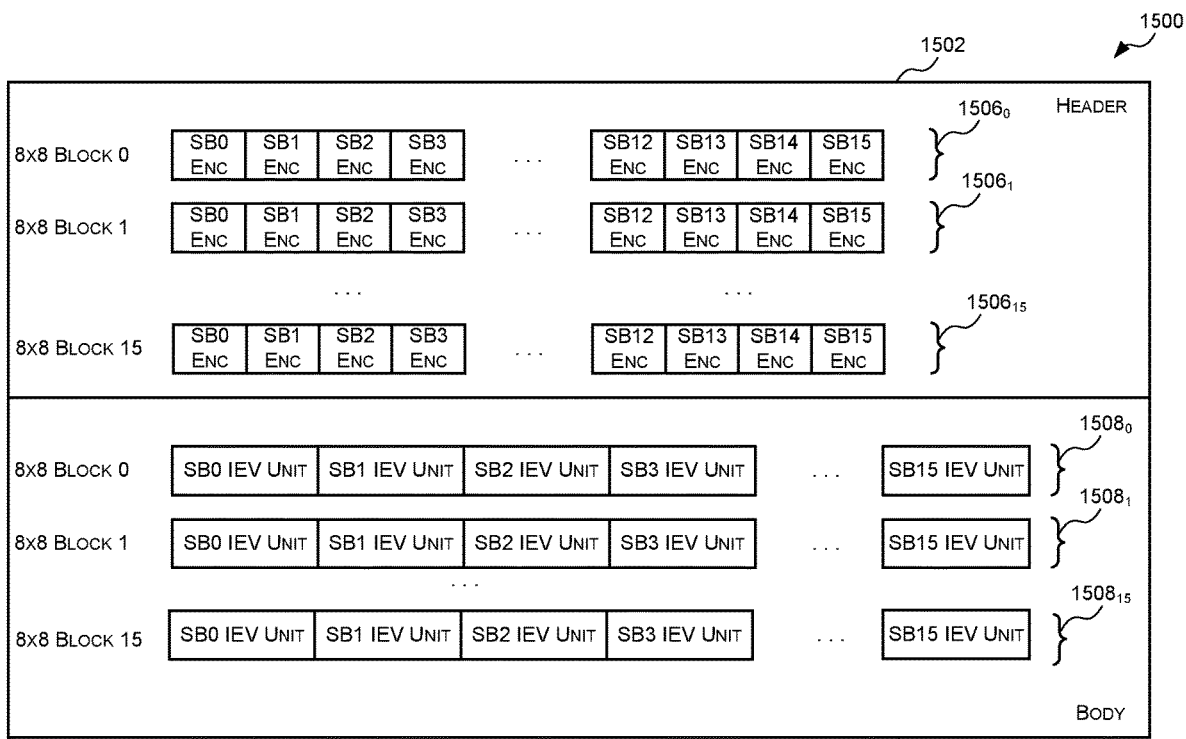
FIG. 15 is a schematic diagram illustrating an example format for a compressed super block of image data.

Reference is now made to FIG. 15 which illustrates an example format for a compressed super block 1500 which comprises the data for a plurality of compressed blocks. In this example each compressed block corresponds to an 8×8 block of image element values and the data corresponding to fifteen compressed blocks corresponding to a 32×32 block of image element values are stored together to form a compressed super block. It will be evident to a person of skill in the art that these are examples only and the principles and techniques described herein may be applied to any size blocks and any number of compressed blocks may be packed together to form a compressed super block.

The compressed super block 1500 of FIG. 15 comprises a header 1502 and a body 1504. The header 1502 comprises an encoding section $1506_0$-$1506_{15}$ for each block of the super block. For example, in FIG. 15 the super block comprises sixteen 8×8 blocks of image element values, so there are sixteen encoding sections, one for each 8×8 block. Each encoding section $1506_0$-$1506_{15}$ identifies the encoding format of each sub-block of the corresponding block. Each encoding section $1506_0$-$1506_{15}$ may correspond to the header 1302 of FIG. 13. Specifically, each encoding section $1506_0$-$1506_{15}$ may comprise a fixed length encoding format field "SBj ENC", wherein j is the sub-block number, for each sub-block. Each fixed length encoding format field may comprise a value that identifies the encoding format of the corresponding sub-block. As described above, if the sub-block is pattern encoded the value may identify the pattern associated with the sub-block, and if the sub-block is match encoded the value may identify the match type (e.g. M-1, M-2, MR and/or MC). The encoding sections $1506_0$-$1506_{15}$ may be packed in the header 1502 in any suitable order. In some cases, the encoding sections $1506_0$-$1506_{15}$ may be packed in the header 1502 in Z order or scanline order.

The body 1504 of the compressed super block comprises an image element value section $1508_0$-$1508_{15}$ for each block of the super block. For example, in FIG. 15 the super block comprises sixteen 8×8 blocks of image element values, so there are sixteen image element value sections $1508_0$-$1508_{15}$. Each image element value section $1508_0$-$1508_{15}$ comprises the image element values that can be used to reconstruct the sub-blocks of the corresponding block. Each image element value section $1508_0$-$1508_{15}$ may correspond to the body 1304 of FIG. 13. Specifically, each image element value section $1508_0$-$1508_{15}$ may comprise an image element value (IEV) unit "SBj IEV Unit", wherein j is the sub-block number, for each pattern encoded sub-block thereof. As described above, each IEV unit comprises the image element values that form the pattern associated with the sub-block. Accordingly, the number of image element values in an IEV unit depends on the number of image element values that form the pattern associated with the corresponding sub-block. For example, as described above, if a sub-block is associated with, or encoded using, a P3 pattern formed of three image element values then the IEV unit for that sub-block may comprise three image element values.

The image element value sections $1508_0$-$1508_{15}$ may be packed in the body 1504 in any suitable order. Preferably, however, the image element value sections $1508_0$-$1508_{15}$ are packed in the body 1504 in the same order as the corresponding encoding sections $1506_0$-$1506_{15}$ are packed in the header 1502.

While the starting address or starting location of each image element value section $1508_0$-$1508_{15}$ in the body 1504 can be calculated by the decompression unit from the information in the header 1502, in some cases, to simplify the decompression process, the header 1502 may also comprise, for each block (e.g. each 8×8 block) of the super block, information identifying the address or location of the corresponding image element value section $1508_0$-$1508_{15}$ in the body. For example, the header may comprise, for each block of the super block, an offset from the start of the body 1504 from which the address of the corresponding image element value section can be determined.

It will be evident to a person of skill in the art that these are example formats for compressed blocks and compressed super blocks generated in accordance with the method 200 of FIG. 2 and that the compressed blocks and/or compressed super blocks may take any suitable form. For example, in other compressed superblocks the encoding and image element value sections for each sub-block may be packed together to form a compressed block and then the compressed blocks may be packed together.

Compression Unit

Figure 16:
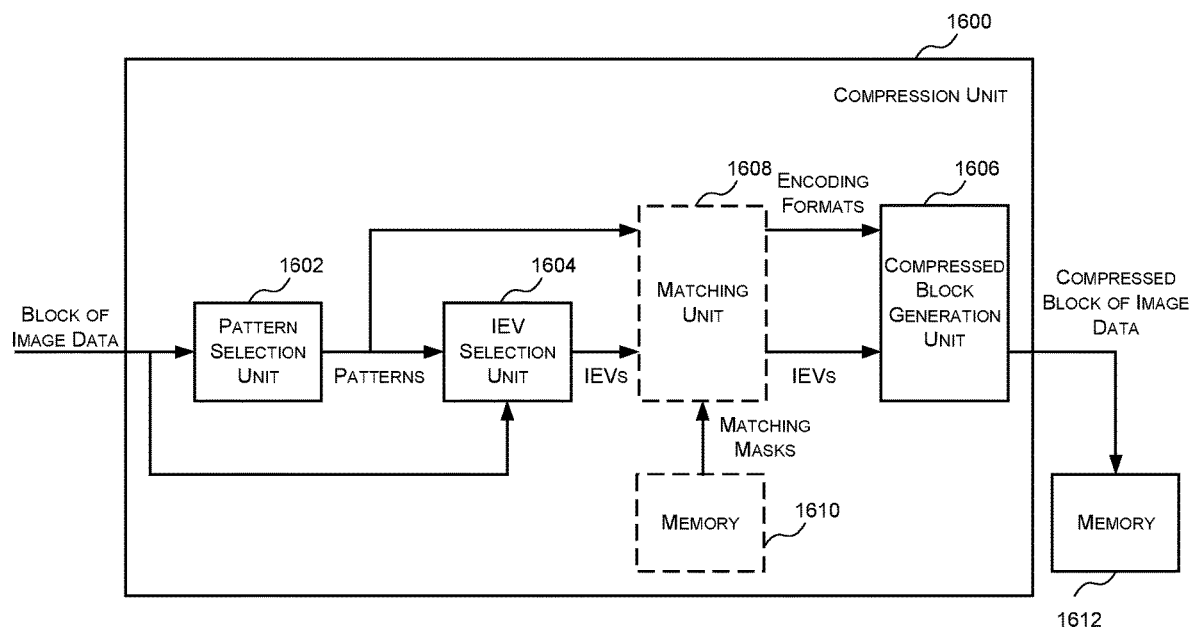
FIG. 16 is a block diagram of an example compression unit.

Reference is now made to FIG. 16 which illustrates an example compression unit 1600 (which may form part of the compression/decompression unit 112 of FIG. 1) for compressing a block of image data using the method 200 of FIG. 2. The compression unit 1600 comprises a pattern selection unit 1602; an image element value (IEV) selection unit 1604 and a compressed block generation unit 1606. In some cases, where the compression unit supports match encoding (e.g. M-1, M-2, MC and/or MR encoding), the compression unit 1600 may also comprise a matching unit 1608.

The pattern selection unit 1602 is configured to receive a block of image data to be compressed and for each sub-block thereof (e.g. each sub-block of size N×M) identify a pattern of a plurality of patterns formed by the image element values of that sub-block. The identified patterns are then output to the IEV selection unit 1604. Each pattern defines a number of image element values in the pattern and the location of each of those image element values in a sub-block. Example patterns for a 2×2 sub-block were described above with reference to FIG. 5. As described above, in some cases, the plurality of patterns may comprise all possible patterns of image element values in a sub-block. For example, where the sub-blocks are 2×2 in size the plurality of patterns may comprise all fifteen patterns $502_0$-$502_{14}$ shown in FIG. 5. However, in other cases, the plurality of patterns may comprise fewer than all possible patterns of image element values in a sub-block. For example, where the sub-blocks are 2×2 in size the plurality of patterns may comprise fewer than fifteen patterns. As described above, the least commonly found pattern(s) may be removed from the plurality of patterns.

The IEV selection unit 1604 is configured to receive the block of image data to be compressed and the patterns associated with each sub-block thereof, and for each sub-block (e.g. each N×M sub-block) identify the relevant image element values thereof based on the associated pattern. The identified IEVs for each sub-block are then provided to the matching unit 1608 (e.g. if the compression unit 1600 has a matching unit 1608) or to the compressed block generation unit 1606 (e.g. if the compression unit 1600 does not have a matching unit 1608). As described above, each pattern is formed by a number of image element values, so the number of relevant image element values of a sub-block is based on the pattern associated with the sub-block. For example, if a sub-block is associated with a P1 pattern that is formed of one image element value then the IEV selection unit 1604 may be configured to identify a single image element value. Similarly, if a sub-block is associated with a P3 pattern that is formed of three image element values then the IEV selection unit 1604 may be configured to identify three image element values.

The matching unit 1608 is configured to receive, for each sub-block, the pattern identified by the pattern selection unit 1602 and the one or more IEVs identified by the IEV selection unit 1604, and determine if any sets of sub-blocks having one of one or more predetermined relationships are all the same, or all match. The matching unit 1608 may be configured to determine that a set of sub-blocks are all the same or all match if they are associated with the same pattern and the same set of IEVs in the same order. If it is determined that a set of sub-blocks with a predetermined relationship are all the same, then one of sub-blocks in the set is associated with the common pattern and the common IEVs and the other sub-blocks in the set are identified as a matching sub-block of a particular type and are not associated with any IEVs. In other words, if it is determined that a set of sub-blocks with a predetermined relationship are all the same, the encoding format of one of the sub-blocks in the set remains the same (i.e. pattern encoded based on the identified pattern and one or more IEVs), and the encoding format of the other sub-blocks in the set is changed to match encoding. If, however, it is determined that a set of sub-blocks with a predetermined relationship do not all match, then the encoding format of each sub-block in the set remains the same (i.e. each sub-block remains a pattern-encoded sub-block that is associated with one or more IEVs). The final encoding formats selected by the matching unit 1608 are output to the compressed block generation unit 1606.

As described above, a set of sub-blocks that have a predetermined relationship may be, for example:
- when the sub-blocks are ordered, a set of sub-blocks comprising a sub-block and the previous sub-block in the order;
- when the sub-blocks are ordered, a set of sub-blocks comprising a sub-block and the sub-block preceding the previous sub-block in the order;
- a set of sub-blocks that form a row of sub-blocks;
- a set of sub-blocks that form a column of sub-blocks; and/or
- a set of sub-blocks that form an A×B block of sub-blocks.

In some cases, there may be a mask for each set of sub-blocks that identifies the sub-blocks in the set. In these cases, the compression unit 1600 may comprise memory 1610 for storing the one or more matching masks and the matching unit 1608 may be configured to read the matching masks from memory 1610.

The compressed block generation unit 1606 is configured to receive the encoding format for each sub-block and the relevant image element values for each sub-block and generate a compressed block of image data therefrom. Where the compression unit 1600 does not comprise a matching unit 1608 then each sub-block may be associated with a pattern and have at least one relevant image element value. Where, however, the compression unit 1600 does comprise a matching unit 1608, then one or more of the sub-blocks may be match encoded and not directly associated with any pattern or any IEVs. In some cases, the compressed block generation unit 1606 may be configured to generate a header for the compressed block of image data that identifies the encoding format of each sub-block, and a body that comprises the relevant image element values for the block. The header may take the format of the header 1302 of FIG. 13. Specifically, the header may comprise a fixed length encoding format field for each sub-block that identifies the encoding format for that sub-block. As described above, the encoding format field may have a value that identifies a pattern associated with the corresponding sub-block or the matching type of the sub-blocks. The body may take the format of the body 1304 of FIG. 13. Specifically, the body may comprise an image element value (IEV) unit for each sub-block that is pattern encoded. Each IEV unit may comprise the image element values relevant to that sub-block. Since the number of relevant image element values for a sub-block is based on the pattern associated therewith the number of image element values in an IEV is based on the number of image element values forming the associated pattern. For example, if a sub-block is associated with, or encoded by, a P2 pattern which is formed by two image element values then the IEV unit for that sub-block may comprise two image element values. Similarly, if a sub-block is associated with, or encoded by, a P4 pattern which is formed by four image element values then the IEV unit for that sub-block may comprise four image element values.

In some cases, the body and the header may be merged (by the compressed block generation unit 1606 or another unit) to form a complete compressed block. However, in other cases the body and the header may be output separately.

The compressed block may be stored in memory 1612. The body and header may be stored in memory 1612 (e.g. frame buffer) together or separately. For example, the body may be stored at a first location in memory 1612 and the body may be stored at a second, different, location in memory 1612.

Decompression

Figure 17:
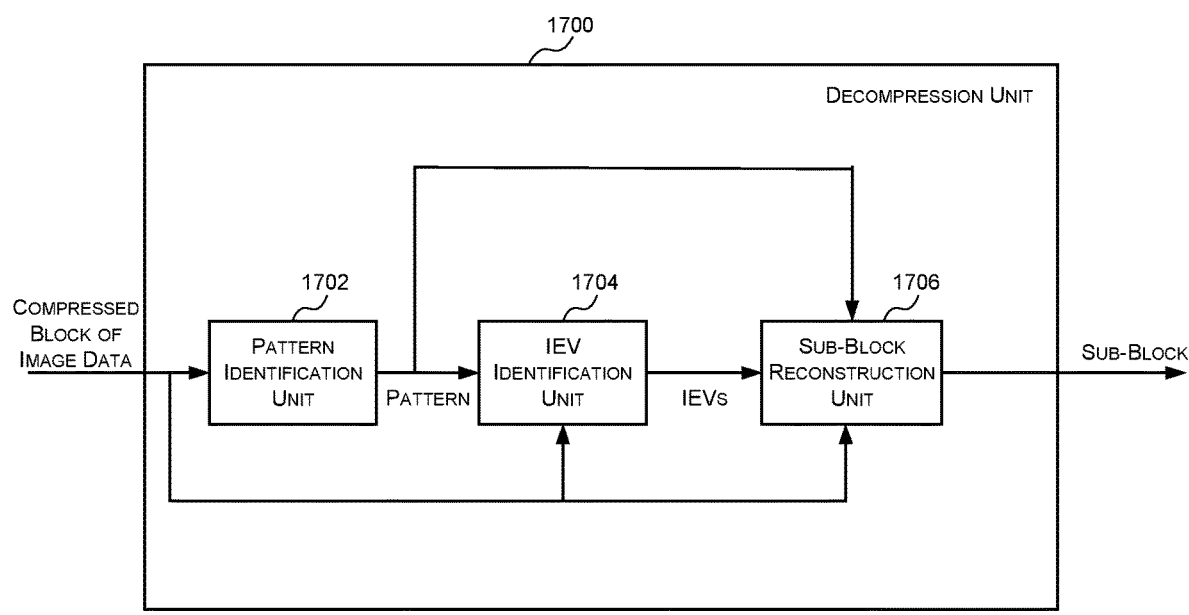
FIG. 17 is a block diagram of an example decompression unit.

Reference is now made to FIG. 17 which illustrates an example decompression unit 1700 (which may form part of the compression/decompression unit 112 of FIG. 1) for decompressing compressed image data generated in accordance with the method 200 of FIG. 2 to provide image element values for a selected sub-block of the image data. The decompression unit 1700 comprises a pattern identification unit 1702, an image element value (I EV) identification unit 1704, and a sub-block reconstruction unit 1706. The pattern identification unit 1702 is configured to identify, from the compressed block of data, the pattern associated with the selected sub-block. Each sub-block will be associated with a pattern either directly (if pattern encoded) or indirectly (if match encoded). The IEV identification unit 1704 is configured to identify, from the compressed block of data, the relevant IEVs for the selected sub-block. The sub-block reconstruction unit 1706 is configured to reconstruct the selected sub-block from the pattern and IEVs associated therewith and output the reconstructed sub-block. The operation of the decompression unit 1700 will now be described in detail with respect to FIG. 18.

Figure 18:
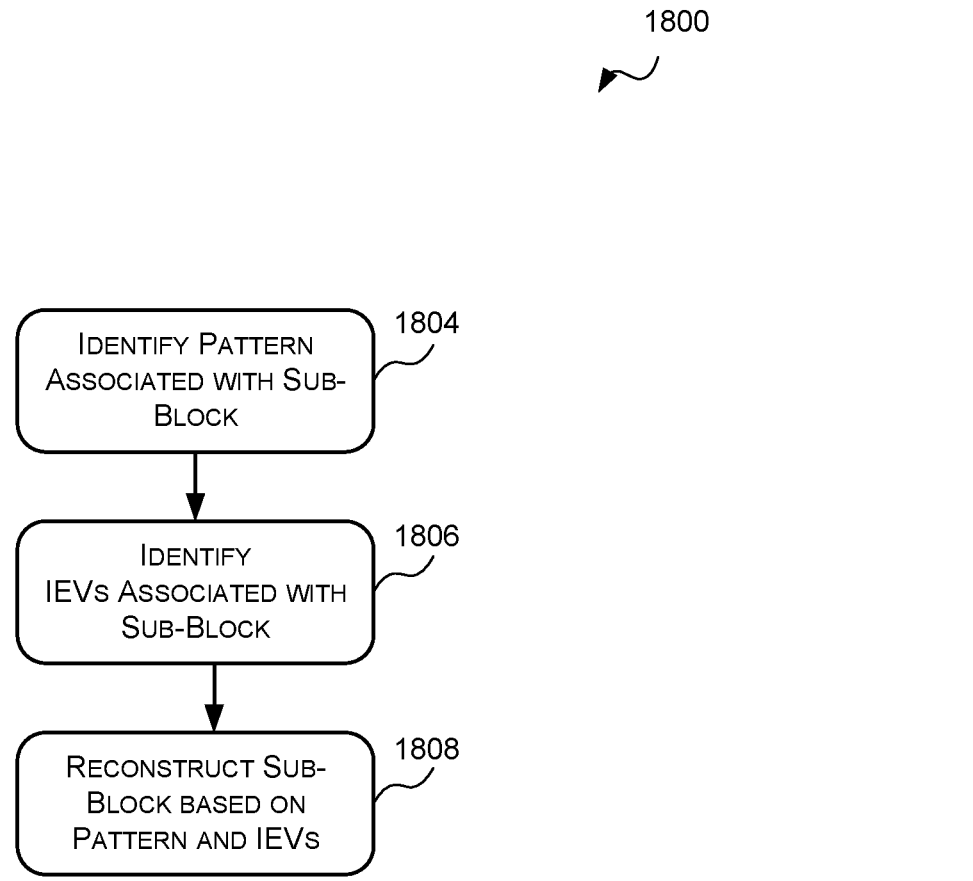
FIG. 18 is a flow diagram of an example method of decompressing a compressed block of image data that was compressed in accordance with the method of FIG. 2.

Reference is now made to FIG. 18 which illustrates an example method 1800, which may be implemented by the decompression unit 1700 of FIG. 17, for decompressing a compressed block of image data generated in accordance with the methods described herein to produce a selected sub-block of the image data. As described above, the compressed block of image data comprises information identifying a pattern of a plurality of patterns associated with each sub-block of the image data and the image element values relevant for reconstructing the sub-blocks from that pattern.

The method 1800 begins at step 1804 where the pattern identification unit 1702 identifies the pattern associated with, or relevant to, the selected sub-block. In the compression algorithms described herein each sub-block is associated with a pattern of a plurality of patterns either directly (if pattern encoded) or indirectly (if match encoded). In either case the relevant pattern can be determined from the encoding format field for the selected sub-block. Specifically, the encoding format field will either identify a pattern associated with the sub-block or point to a sub-block that is associated with the relevant pattern. Where the encoding format fields are stored in the header of the compressed block the pattern identification unit 1702 may read the header of the compressed block from memory to identify the pattern associated with, or relevant to, the selected sub-block.

If the compressed block was generated in accordance with a compression algorithm that only supports pattern encoding, then each sub-block will be directly associated with a pattern of the plurality of patterns. In these cases, the compressed block may comprise information for each sub-block that directly identifies the pattern associated with that sub-block. For example, as described above, the compressed block may comprise an encoding format field for each sub-block that identifies the pattern associated with that sub-block. Therefore, in these cases, identifying the pattern associated with the selected sub-block may comprise reading the encoding format field for the selected sub-block and identifying the pattern identified thereby as the relevant pattern for the selected sub-block. Where the encoding format fields for the sub-blocks are fixed-length and are packed in the compressed block (e.g. header) in a predetermined order the pattern identification unit 1702 may be configured to determine the location of a particular encoding format field based on the length of each encoding format field and the order of the encoding format fields in the compressed block. For example, if each encoding format field is four bits then the encoding format field for the nth sub-block (SBn) will be at the n*4 bit of the header.

For example, if each encoding format field is four bits and the encoding format fields for the sub-blocks are stored in sub-block order, then if the selected sub-block is sub-block 5 (SB5) then the pattern identification unit 1702 may be configured to determine that bits 20-23 of the header correspond to the encoding format field for sub-block 5 (SB5). The pattern identification unit may then read the encoding format field for sub-block 5 (SB5) at the identified location in the compressed block. If the encoding format field for sub-block 5 (SB5) indicates that sub-block 5 (SB5) is associated with the P3C pattern, for example, the pattern identification unit 1702 may be configured to identify the P3C pattern as the relevant pattern for sub-block 5 (SB5).

If, however, the compressed block was generated in accordance with a compression algorithm that supports both pattern encoding and match encoding each sub-block may either be pattern encoded or match encoded. If a sub-block is pattern encoded the encoding format field may identify a pattern used to encode the sub-block. If, however, a sub-block is match encoded the encoding format field may identify a match type which points to a matching sub-block. Accordingly, in theses cases identifying the pattern associated with a selected sub-block may first comprise determining, from the encoding format field for the selected sub-block, whether the sub-block was pattern encoded or match encoded.

Figure 19:
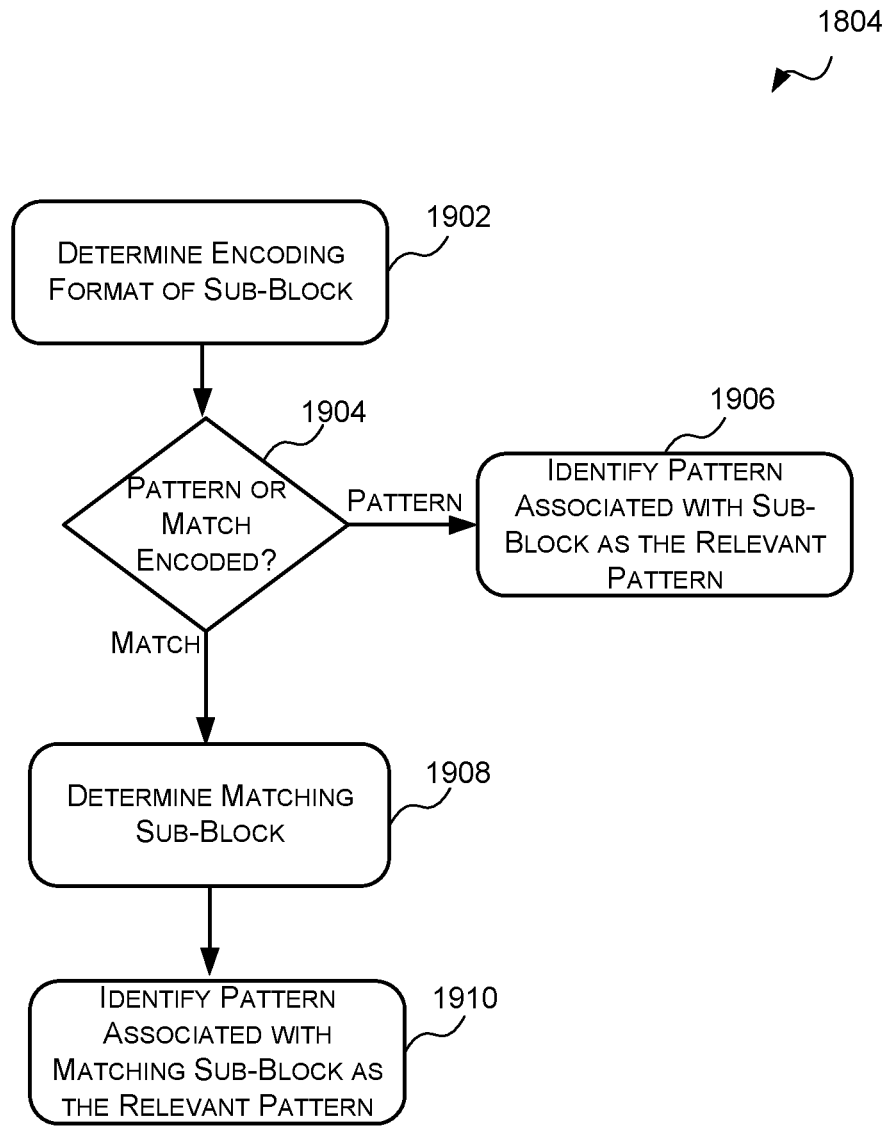
FIG. 19 is a flow diagram of an example method of identifying the pattern associated with a sub-block.

For example, reference is now made to FIG. 19 which illustrates an example method for identifying the pattern associated with a sub-block when the compressed block was generated in accordance with a compression algorithm that supports both pattern encoding and match encoding. The method begins at step 1902 where the encoding type of the selected sub-block is identified from the encoding format field for the selected sub-block. As described above, each encoding format field may comprise a value that identifies a pattern of the plurality of patterns or a match-type. If the encoding format field of the selected sub-block indicates the selected sub-block was pattern encoded (e.g. it identifies a pattern) (step 1904) then the pattern identified by the encoding format field is identified as the relevant pattern for the selected sub-block (step 1906). For example, if the compressed block is the compressed block 1400 of FIG. 14 and the selected sub-block is sub-block 5 (SB5), then the pattern identification unit 1702 may be configured to read the encoding format field 1406₅ associated with sub-block 5 (SB5). The encoding format field 1406₅ for sub-block 5 (SB5) comprises the binary value '1000', which according to Table 3, identifies the pattern P3B. Accordingly, sub-block 5 (SB5) was pattern encoded and the relevant pattern is P3B.

If, however, the encoding format field of the selected sub-block indicates the selected sub-block was match encoded (e.g. it identifies a match-type) (step 1904), then the matching sub-block is determined from the match-type (step 1908). The encoding format field of the matching sub-block is then read, and the pattern identified thereby is identified as the relevant pattern for the selected sub-block (step 1910). For example, if the compressed block is the compressed block 1400 of FIG. 14 and the selected sub-block is sub-block 3 (SB3), then the pattern identification unit 1702 may be configured to read the encoding format field 1406₃ associated with sub-block 3 (SB3). The encoding format field 1406₃ for sub-block 3 (SB3) comprises the binary value '1110', which, according to Table 3, identifies a matching type, specifically match-row (MR). Accordingly, sub-block 3 (SB3) was match encoded. The pattern identification unit 1702 then determines from the match-type that the matching sub-block is the first sub-block in the row (i.e. sub-block 2 (SB2) in block 600). The pattern identification unit 1702 then reads the encoding format field 1406₂ for sub-block 2 (SB2). The encoding format field 1406₂ for sub-block 2 (SB2) has the binary value '0010' which, according to Table 3, identifies pattern P2B so the pattern identification unit 1702 identifies pattern P2B as the relevant pattern for sub-block 3 (SB3).

Returning to FIG. 18, once the pattern identification unit 1702 has identified the pattern associated with, or relevant to, the selected sub-block the method 1800 proceeds to step 1806.

At step 1806, the IEV identification unit 1704 identifies the image element values in the compressed block of image data that are relevant to, or associated with, the selected sub-block. In the compression algorithms described herein each sub-block is associated with one or more image element values, either directly (if pattern encoded) or indirectly (if match encoded), which in combination with the relevant pattern can be used to reconstruct the sub-block.

In some cases, identifying the image element values in the compressed block of image data that are relevant to the selected sub-block may comprise identifying the number of relevant image element values (e.g. from the pattern associated with the selected sub-block) and identifying the location of the relevant image element values (e.g. from the encoding format fields of the preceding sub-blocks in the compressed block).

Figure 20:
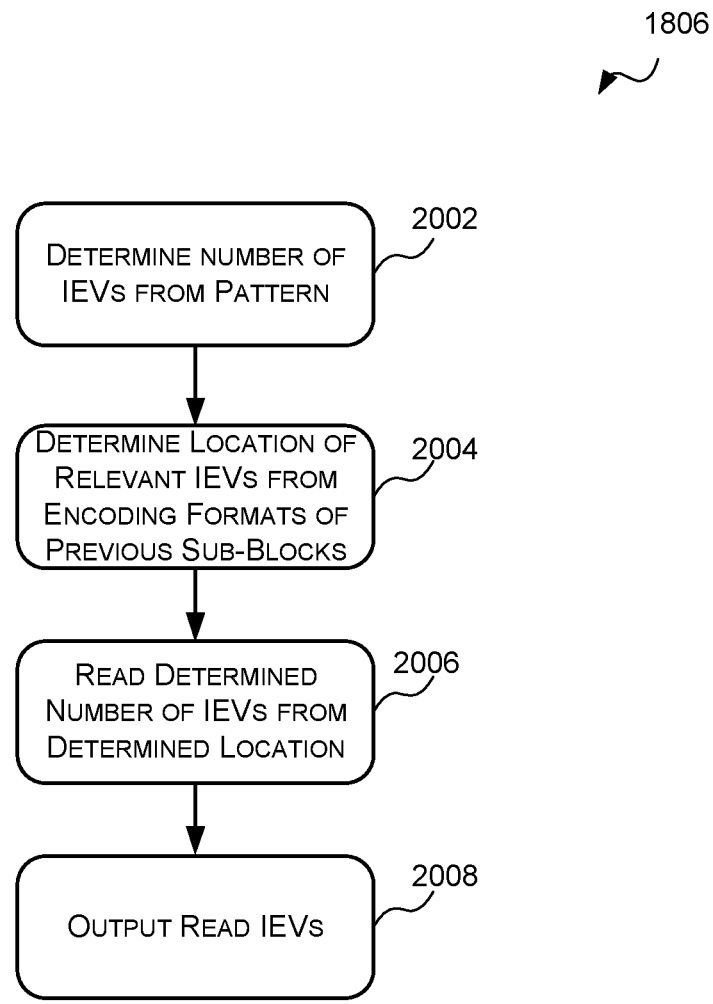
FIG. 20 is a flow diagram of an example method of identifying the image element values associated with a sub-block.

Reference is now made to FIG. 20 which illustrates an example method which may be implemented by the IEV identification unit 1704 to identify the image element values relevant to, or associated with, the selected sub-block. The method begins at step 2002 where the IEV identification unit 1704 determines the number of image element values relevant to the selected sub-block from the pattern associated with the selected sub-block (as identified in step 1804). As described above, each pattern is formed by a particular number of image element values so the pattern itself indicates the number of relevant image element values in the compressed block. For example, a P1 pattern is formed of one image element value so a sub-block that is associated with a P1 pattern will have one relevant image element value. Similarly, a P3 pattern is formed of three image element values so a sub-block that is associated with a P3 pattern will have three relevant image element values.

Once the number of relevant image element values has been determined the method proceeds to step 2004 where the IEV identification unit 1704 determines the location of the relevant IEVs in the compressed block. As described above, in some cases the compressed block may comprise an IEV unit for each pattern encoded sub-block. Each IEV unit comprises the relevant IEVs for the associated sub-blocks. The number of IEVs in each IEV unit is based on the pattern associated with the corresponding sub-block. For example, the IEV unit for a sub-block associated with a P3 pattern, which is formed of three IEVs, will have three IEVs. In contrast, the IEV unit for a sub-block associated with a P2 pattern, which is formed of two IEVs, will have two IEVs. The IEV units may be packed in the compressed block in a particular order.

In these cases, identifying the location of the relevant IEVs may comprise determining the relevant IEV unit and then determining the number of IEVs preceding that IEV unit in the compressed block. If the sub-block was pattern encoded (as indicated by the encoding format field) then the relevant IEVs will be the IEVs for that sub-block. In contrast, if the sub-block was match encoded (as indicated by the encoding format field) then the relevant IEVs will be the IEVs for the matching sub-block. For example, if the compressed block is the compressed block 1400 of FIG. 14 and the selected sub-block is sub-block 5 (SB5) which was pattern encoded, then the relevant IEV unit is the IEV unit 1408$_5$ associated with sub-block 5 (SB5). If, however, the compressed block is the compressed block 1400 of FIG. 14 and the selected sub-block is sub-block 3 (SB3) which was match encoded (i.e. MR encoded), then the relevant IEV unit is the IEV unit 1408$_2$ associated with the matching sub-block (i.e. sub-block 2 (SB2)).

The number of IEVs preceding the relevant IEV unit can then be determined from the encoding formats of sub-blocks preceding the relevant sub-block in the order. Specifically, if there are two sub-blocks preceding the relevant sub-block in the order, and one was pattern encoded using a P2 pattern and the other was pattern encoded using a P3 pattern, then there will be five IEVs preceding the relevant IEVs. Thus the location of the relevant IEV unit can be determined as the body start address +5*(size of IEV).

For example, if the compressed block is the compressed block 1400 of FIG. 14 and the selected sub-block is sub-block 5 (SB5) then the relevant IEV unit is the IEV unit 1408$_5$ associated with sub-block 5 (SB5). In this example, the relevant sub-block (sub-block 5) is preceded in the order by sub-blocks 0-4. So the IEV identification unit 1704 may be configured to read the encoding format fields 1406$_0$-1406$_4$ for sub-blocks 0-4 to determine how many IEVs precede the relevant IEV unit in the compressed block. In this example, sub-block 0 is pattern encoded using a P4 pattern (so 4 IEVs in that IEV unit), sub-block 1 is pattern encoded using a P3 pattern (so 3 IEVs in that IEV unit), sub-block 2 is pattern encoded using a P2 pattern (so 2 IEVs in that IEV unit), sub-block 3 is match encoded (so no IEV unit), and sub-block 4 is pattern encoded using a P3 pattern (so 3 IEVs in that IEV unit). Therefor there are 12 (4+3+2+3) IEVs preceding the relevant IEV unit in the body. Accordingly, the address of the relevant IEV unit is start address of body+(12*(size of IEV)).

Once the location of the relevant IEVs has been determined (at step 2004) then the IEV identification unit 1704 reads the determined number of IEVs from the determined location (e.g. read the determined number of IEVs from the determined location in memory) (step 2006) and then outputs the read IEVs as the relevant IEVs for the selected sub-block (step 2008).

Returning to FIG. 18, once the relevant IEVs for the sub-block have been identified the method 1800 proceeds to step 1808.

At step 1808, the sub-block reconstruction unit 1706 generates the selected sub-block from the relevant pattern (identified in step 1804) and the relevant IEVs (identified in step 1806). Specifically, the pattern identifies the location of the relevant IEVs in a sub-block.

Accordingly, it can be seen that the described pattern-based compression methods allow any sub-block in a block to be decompressed without having to decompress the whole block. This thus reduces the wastage of memory bandwidth for the IEVs that are not needed.

Combining Pattern-Based Compression with Fixed-Length Compression Method

Testing has shown that in some cases the compression ratio can be further improved by, instead of directly compressing image element values (e.g. colour values) generated by a rasterizer, compressing the raw image element values (e.g. colour values) using another method, such as the fixed-length compression algorithm described in the Applicant's UK Patent Applications 1912183.9, 1912184.7, 1912795.0, and 1912800.8, and then compressing the compressed image element values using the pattern-based compression method described herein.

Specifically, the identified UK patent applications describe methods and systems for compressing a block of image data that comprises a plurality of image element values (e.g. colour values) that are divisible into at least a first value and a second value (e.g. a first channel colour value and a second channel colour value) such that the image data comprises at least a two-dimensional block of first values (e.g. a two-dimensional block of colour values for the first colour channel) and a two-dimensional block of second values (e.g. a two-dimensional block of colour values for the second colour channel). Each two-dimensional block of values is compressed separately using one or more fixed-length compression algorithms.

In particular, one or more of the two-dimensional blocks of values is compressed by compressing all or a portion of the two-dimensional block of values using a fixed-length compression algorithm wherein values in the two-dimensional block (or a portion thereof) are represented by common base information and a fixed-length parameter for each value in the block (or a portion thereof) that is zero, one or more than one bits in length. A compressed block for the image data is then formed from the common base information and the fixed-length parameters. By compressing a two-dimensional block of values (or a portion thereof) using a fixed-length compression algorithm all of the values in that two-dimensional block (or the portion thereof) are represented using the same number of bits thus the portion of the compressed data that relates to a particular value can be easily identified.

Test Results

Figure 21:
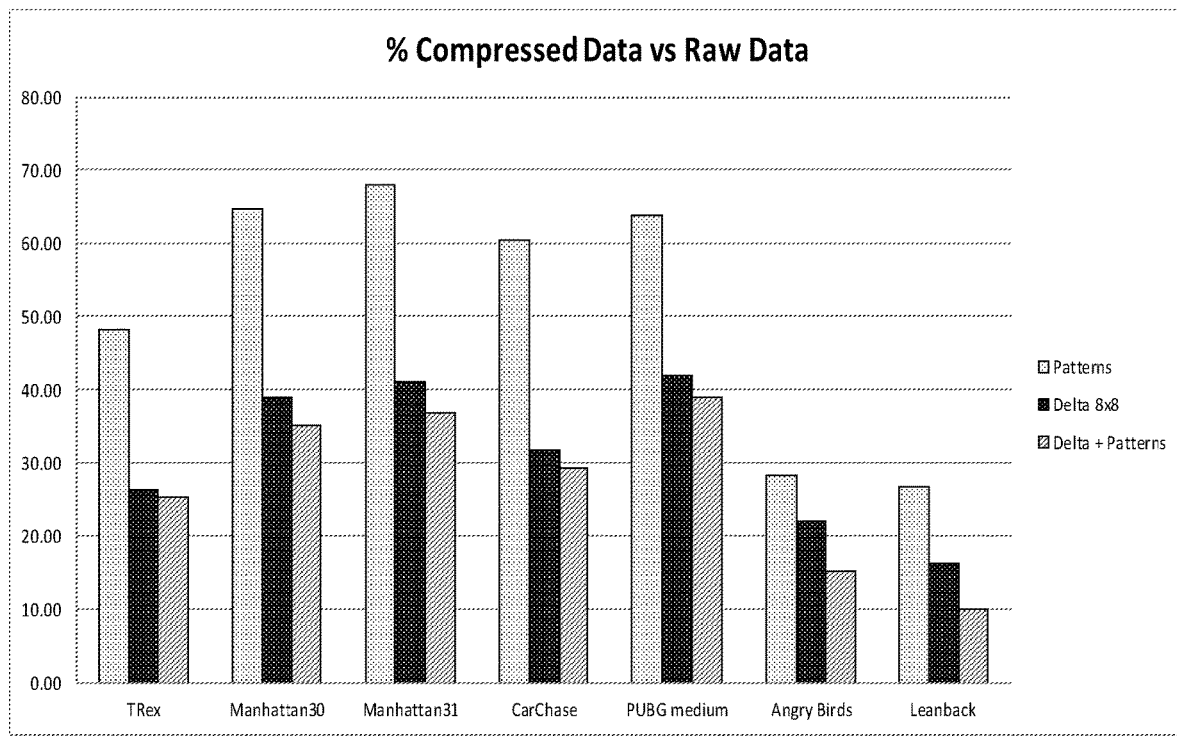
FIG. 21 is a graph illustrating the compression ratio when compressing colour data in accordance with the method of FIG. 2 for a plurality of benchmarks.

Reference is now made to FIG. 21 which illustrates the compression ratio using the method of FIG. 2 with the encoding formats of Table 3 with 8×8 blocks and 2×2 sub-blocks, which is referred to as "Patterns" in FIG. 21, for a plurality of benchmark tests (TRex, Manhattan 3.0, Manhattan 3.2, CarChase, PUBG medium, Angry Birds, Leanback). FIG. 21 also shows the compression ratio, for the same benchmark tests, using the random accessible compression method of UK Patent Applications 1912183.9, 1912184.7, 1912795.0, and 1912800.8, which is referred to as "Delta 8×8"; and the compression ratio, for the same benchmark tests, using the patterned based compression method described herein on 8×8 blocks compressed in accordance with the random accessible compression method, which is referred to as "Delta+Patterns" in FIG. 21.

It can be seen from FIG. 21 that colour values in complex 3D benchmark tests, such as Manhattan 3.0, Manhattan 3.1, CarChase and PUBG medium, can be compressed to 50% to 70% of its original size using the pattern based compression methods described herein. It also can be seen from FIG. 21 that the colour values in less complex 3D benchmark tests, such as Angry Birds and Leanback, can be compressed to 30% of its original size using the pattern based compression methods described herein.

FIG. 21 also shows that the compression ratio can be further improved by performing pattern-based compression on the compressed data generated by an image element value based compression method such as the random accessible compression method described in the Applicant's earlier patent applications.

Figure 22:
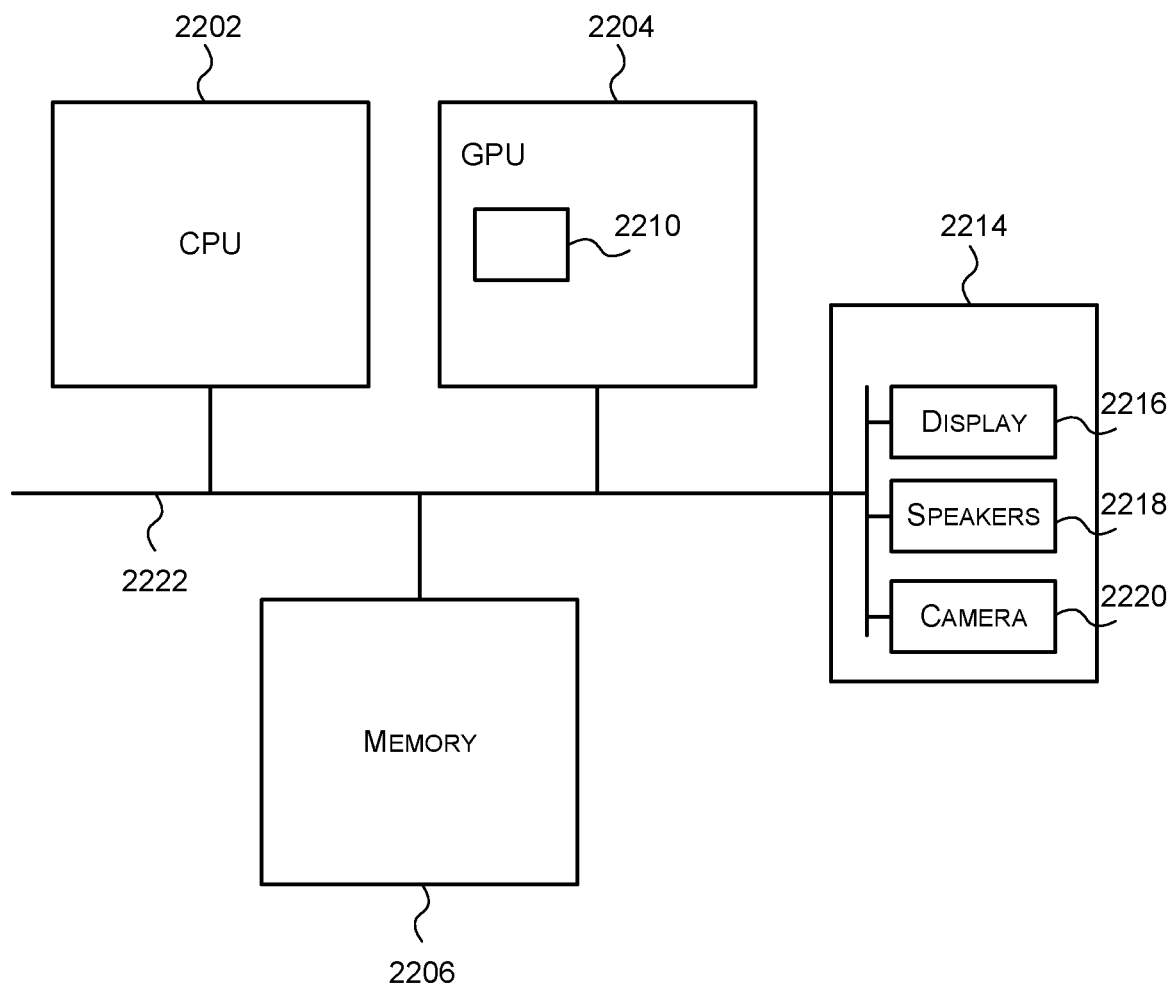
FIG. 22 is a block diagram of an example computer system in which the compression units, decompression units and/or compression/decompression units described herein may be implemented.

FIG. 22 shows a computer system in which the compression units, decompression units, and compression/decompression units described herein may be implemented. The computer system comprises a CPU 2202, a GPU 2204, a memory 2206 and other devices 2214, such as a display 2216, speakers 2218 and a camera 2220. A processing block 2210 (which may be a compression unit, a decompression unit, or a compression/decompression unit described herein) is implemented on the GPU 2204. In other examples, the processing block 2210 may be implemented on the CPU 2202. The components of the computer system can communicate with each other via a communications bus 2222.

The compression and decompression units of FIGS. 16-17 are shown as comprising a number of functional blocks or units. This is schematic only and is not intended to define a strict division between different logic elements of such entities. Each functional block or unit may be provided in any suitable manner. It is to be understood that intermediate values described herein as being formed by a block or unit need not be physically generated by compression or decompression unit at any point and may merely represent logical values which conveniently describe the processing performed by the compression or decompression unit between its input and output.

The compression units, decompression units, and/or compression/decompression units described herein may be embodied in hardware on an integrated circuit. The compression units, decompression units, and/or compression/ decompression units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a compression unit, decompression unit, or compression/decompression unit configured to perform any of the methods described herein, or to manufacture a processor comprising any apparatus described herein. An integrated circuit definition dataset may be, for example, an integrated circuit description.

Therefore, there may be provided a method of manufacturing, at an integrated circuit manufacturing system, a compression unit, a decompression unit, and/or compression/decompression unit as described herein. Furthermore, there may be provided an integrated circuit definition dataset that, when processed in an integrated circuit manufacturing system, causes the method of manufacturing a compression unit, decompression unit, and/or compression/decompression unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a compression unit, a decompression unit, and/or a compression/decompression unit will now be described with respect to FIG. 23.

Figure 23:
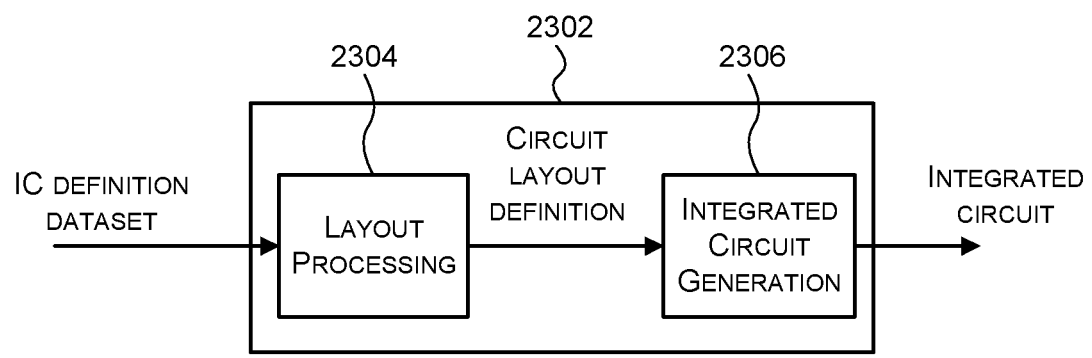
FIG. 23 is a block diagram of an example integrated circuit manufacturing system for generating an integrated circuit embodying a compression unit, a decompression unit or a compression/decompression unit described herein.

FIG. 23 shows an example of an integrated circuit (IC) manufacturing system 2302 which is configured to manufacture a compression unit, a decompression unit, and/or a compression/decompression unit as described in any of the examples herein. In particular, the IC manufacturing system 2302 comprises a layout processing system 2304 and an integrated circuit generation system 2306. The IC manufacturing system 2302 is configured to receive an IC definition dataset (e.g. defining a compression unit, a decompression unit, and/or a compression/decompression unit as described in any of the examples herein), process the IC definition dataset, and generate an IC according to the IC definition dataset (e.g. which embodies a compression units, decompression units, or compression/decompression unit as described in any of the examples herein). The processing of the IC definition dataset configures the IC manufacturing system 2302 to manufacture an integrated circuit embodying a compression unit, a decompression unit, or a compression/decompression unit as described in any of the examples herein.

The layout processing system 2304 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 2304 has determined the circuit layout it may output a circuit layout definition to the IC generation system 2306. A circuit layout definition may be, for example, a circuit layout description.

The IC generation system 2306 generates an IC according to the circuit layout definition, as is known in the art. For example, the IC generation system 2306 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 2306 may be in the form of computer-readable code which the IC generation system 2306 can use to form a suitable mask for use in generating an IC.

The different processes performed by the IC manufacturing system 2302 may be implemented all in one location, e.g. by one party. Alternatively, the IC manufacturing system 2302 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a compression unit, a decompression unit, or a compression/decompression unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 23 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 23, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of decompressing a selected sub-block of image element values from a compressed block of image element values, the method comprising:
    identifying, from the compressed block of image element values, a pattern of a plurality of patterns of image element values relevant to the selected sub-block;
    identifying, from the compressed block of image element values, an image element value unit relevant to the selected sub-block, the image element value unit comprising a set of one or more image element values relevant to the selected sub-block; and
    generating the selected sub-block from the pattern and the set of one or more image element values relevant to the selected sub-block.

2. The method of claim 1, wherein:
    the compressed block of image element values is divided into a plurality of sub-blocks;
    the compressed block of image element values comprises information, for each sub-block of the plurality of sub-blocks, identifying an encoding format of that sub-block; and
    the pattern relevant to the selected sub-block is identified from the information identifying the encoding format of the selected sub-block.

3. The method of claim 2, wherein:
    the compressed block of image element values comprises, for each sub-block of the plurality of sub-blocks, an image element value unit that comprises a set of one or more image element values associated with that sub-block; and
    the image element value unit relevant to the selected sub-block is the image element value unit for the selected sub-block.

4. The method of claim 2, wherein:
    the information identifying the encoding format of a sub-block identifies (i) one pattern of the plurality of patterns or (ii) another sub-block that matches that sub-block; and
    identifying, from the compressed block of image element values, the pattern of the plurality of patterns relevant to the selected sub-block comprises:
        if the information identifying the encoding format of the selected sub-block identifies one pattern, identifying that pattern as the pattern relevant to the selected sub-block; and
        if the information identifying the encoding format of the selected sub-block identifies another sub-block that matches the selected sub-block, identifying a pattern associated with the matching sub-block as the pattern relevant to the selected sub-block.

5. The method of claim 4, wherein the information identifying the encoding format of a sub-block is a value that identifies (i) one pattern of the plurality of patterns; or (ii) another sub-block that matches that sub-block.

6. The method of claim 4, wherein
    the compressed block of image element values comprises, for each sub-block whose corresponding information identifying the encoding format of the sub-block identifies one pattern, an image element value unit that comprises a set of one or more image element values of that sub-block that form the identified pattern; and
    the image element value unit relevant to the selected sub-block is the image element value unit associated with the selected sub-block or the image element value unit associated with the sub-block that matches the selected sub-block.

7. The method of claim 6, wherein:
    the plurality of sub-blocks are ordered;
    the image element value units are stored in the compressed block of image element values in the order of their corresponding sub-blocks; and
    the method further comprises identifying a location of the image element value unit relevant to the selected sub-block in the compressed block of image element values based on the information identifying the encoding format of each of the sub-blocks preceding the selected sub-block in the order.

8. The method of claim 7, wherein identifying the location of the image element value unit relevant to the selected sub-block in the compressed block of image element values comprises identifying a number of image element values preceding the image element value unit relevant to the selected sub-block in the compressed block of image element values.

9. The method of claim 8, wherein:
    the information identifying the encoding format of one or more sub-blocks identifies a pattern of the plurality of patterns;
    each pattern is formed by a number of image element values; and
    identifying the number of image element values preceding the image element value unit relevant to the selected sub-block comprises summing the number of image element values forming the patterns identified by the information identifying the encoding format of each of the sub-blocks preceding the selected sub-block in the order.

10. The method of claim 6, wherein the image element value units are stored in a body of the compressed block of image element values.

11. The method of claim 2, wherein the information identifying the encoding format of a sub-block comprises a fixed-length encoding format field.

12. The method of claim 1, wherein each pattern of the plurality of patterns defines a number of image element values and a location of those image element values in a sub-block.

13. The method of claim 1, wherein each image element value is a colour value.

14. The method of claim 1, wherein each image element value is a compressed value representing a colour value.

15. The method of claim 1, wherein the image element values are image element values generated by a rasterization process on a graphics processing unit.

16. The method of claim 1, wherein each sub-block comprises an N×M block of image element values wherein N and M are integers greater than or equal to one.

17. The method of claim 1, further comprising outputting the generated sub-block.

18. A decompression unit to decompress a selected sub-block of image element values from a compressed block of image element values, the decompression unit comprising:
- a pattern identification unit configured to identify, from the compressed block of image element values, a pattern of a plurality of patterns of image element values relevant to the selected sub-block;
- an image element value identification unit configured to identify, from the compressed block of image element values, an image element value unit relevant to the selected sub-block, the image element value unit comprising a set of one or more image element values relevant to the selected sub-block; and
- a sub-block reconstruction unit configured to generate the selected sub-block from the pattern and the set of one or more image element values relevant to the selected sub-block.

19. A non-transitory computer readable storage medium having stored thereon computer readable instructions that, when executed at a computer system, cause the computer system to decompress a selected sub-block of image element values from a compressed block of image element values as set forth in claim 1.

20. A non-transitory computer readable storage medium having stored thereon a computer readable dataset description of the decompression unit as set forth in claim 18 that, when processed in an integrated circuit manufacturing system, causes the integrated circuit manufacturing system to manufacture an integrated circuit embodying said decompression unit.

* * * * *

UNITED STATES PATENT AND TRADEMARK OFFICE
CERTIFICATE OF CORRECTION

| | |
|---|---|
| PATENT NO. | : 12,106,525 B2 |
| APPLICATION NO. | : 17/217363 |
| DATED | : October 1, 2024 |
| INVENTOR(S) | : Xile Yang |

It is certified that error appears in the above-identified patent and that said Letters Patent is hereby corrected as shown below:

In the Specification

Column 10, Line 4:
00
Should read as:
-- 300 --

Signed and Sealed this
Third Day of December, 2024

*Katherine Kelly Vidal*
Katherine Kelly Vidal
*Director of the United States Patent and Trademark Office*